US009950932B2

(12) United States Patent
Kolb et al.

(10) Patent No.: US 9,950,932 B2
(45) Date of Patent: Apr. 24, 2018

(54) ZIRCONIA-BASED PARTICLES DOPED WITH A LANTHANIDE ELEMENT

(75) Inventors: Brant U. Kolb, Afton, MN (US); Mark J. Hendrickson, Minneapolis, MN (US); James P. Mathers, Woodbury, MN (US); Kathleen M. Humpal, Stillwater, MN (US); Neeraj Sharma, Woodbury, MN (US); Myles L. Brostrom, West Lakeland Township, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 223 days.

(21) Appl. No.: 13/512,107

(22) PCT Filed: Dec. 21, 2010

(86) PCT No.: PCT/US2010/061539
§ 371 (c)(1),
(2), (4) Date: May 25, 2012

(87) PCT Pub. No.: WO2011/082031
PCT Pub. Date: Jul. 7, 2011

(65) Prior Publication Data
US 2012/0264588 A1    Oct. 18, 2012

Related U.S. Application Data

(60) Provisional application No. 61/290,644, filed on Dec. 29, 2009.

(51) Int. Cl.
*C04B 35/48* (2006.01)
*C08K 3/22* (2006.01)
(Continued)

(52) U.S. Cl.
CPC .............. *C01G 25/00* (2013.01); *B82Y 30/00* (2013.01); *C01G 25/006* (2013.01); *C01G 25/02* (2013.01);
(Continued)

(58) Field of Classification Search
None
See application file for complete search history.

(56) References Cited

U.S. PATENT DOCUMENTS 3,058,594 A    10/1962    Hultgren
4,639,356 A    1/1987    O'Toole
(Continued)

FOREIGN PATENT DOCUMENTS

EP    1550644    7/2005
EP    1550645    7/2005
(Continued)

OTHER PUBLICATIONS

Adschiri, "Rapid and Continuous Hydrothermal Crystallization of Metal Oxide Particles in Supercritical Water", Journal of the American Ceramic Society, 1992, vol. 75, No. 4, pp. 1019-1022.
(Continued)

*Primary Examiner* — Ronak Patel
(74) *Attorney, Agent, or Firm* — Jean A. Lown

(57) ABSTRACT

Zirconia-based particles, sols containing the zirconia-based particles, methods of making the sols and the zirconia-based particles, composites containing the zirconia-based particles in an organic matrix, and sintered bodies prepared from the zirconia-based particles are described. The zirconia-based particles are crystalline, have a primary particles size no greater than 100 nanometers, and are doped with a lanthanide element or with both a lanthanide element and yttrium.

17 Claims, 2 Drawing Sheets

(51) Int. Cl.
  *B82Y 30/00* (2011.01)
  *B82Y 40/00* (2011.01)
  *C01G 25/00* (2006.01)
  *C01G 25/02* (2006.01)
  *C04B 35/486* (2006.01)
  *C04B 35/624* (2006.01)
  *C04B 35/626* (2006.01)

(52) U.S. Cl.
  CPC .......... *C04B 35/486* (2013.01); *C04B 35/624* (2013.01); *C04B 35/6263* (2013.01); *C01P 2002/52* (2013.01); *C01P 2002/60* (2013.01); *C01P 2002/72* (2013.01); *C01P 2002/77* (2013.01); *C01P 2004/64* (2013.01); *C04B 2235/3224* (2013.01); *C04B 2235/3225* (2013.01); *C04B 2235/3227* (2013.01); *C04B 2235/3229* (2013.01); *C04B 2235/3244* (2013.01); *C04B 2235/443* (2013.01); *C04B 2235/449* (2013.01); *C04B 2235/549* (2013.01); *C04B 2235/5454* (2013.01); *C04B 2235/9615* (2013.01); *C08K 3/22* (2013.01)

(56) References Cited

U.S. PATENT DOCUMENTS

| | | | |
|---|---|---|---|
| 4,753,902 A * | 6/1988 | Ketcham | C04B 35/803 501/103 |
| 4,758,541 A | 7/1988 | Tsukuma | |
| 4,764,491 A | 8/1988 | Quadir | |
| 4,788,045 A | 11/1988 | Colombet | |
| 4,842,739 A | 6/1989 | Tang | |
| 4,985,229 A | 1/1991 | Obitsu | |
| 5,017,532 A | 5/1991 | Sonnenberg | |
| 5,037,579 A | 8/1991 | Matchett | |
| 5,453,262 A | 9/1995 | Dawson | |
| 5,468,847 A | 11/1995 | Heilmann | |
| 5,652,192 A | 7/1997 | Matson | |
| 5,849,068 A | 12/1998 | Hofmann | |
| 6,376,590 B2 | 4/2002 | Kolb | |
| 6,887,588 B2 | 5/2005 | Ackerman | |
| 7,241,437 B2 | 7/2007 | Davidson | |
| 1,942,401 A1 | 8/2008 | Larcher | |
| 7,429,422 B2 | 9/2008 | Davidson | |
| 7,527,761 B2 | 5/2009 | Swartzlander | |
| 7,674,523 B2 | 3/2010 | Davidson | |
| 8,383,266 B2 | 2/2013 | Laube | |
| 2006/0148950 A1* | 7/2006 | Davidson et al. | 524/413 |
| 2008/0118635 A1* | 5/2008 | Larsen | H01M 4/8885 427/115 |
| 2009/0004098 A1 | 1/2009 | Schmidt | |
| 2009/0047562 A1* | 2/2009 | Hata et al. | 429/33 |
| 2009/0061278 A1* | 3/2009 | Menon | B01D 67/0041 429/492 |
| 2009/0292366 A1* | 11/2009 | Burger | C04B 35/4885 623/23.56 |
| 2010/0041542 A1 | 2/2010 | Rolf | |
| 2010/0071179 A1* | 3/2010 | Koizumi | C01G 23/003 29/25.35 |
| 2010/0276374 A1 | 11/2010 | Kolb | |
| 2011/0260349 A1 | 10/2011 | Rolf | |

FOREIGN PATENT DOCUMENTS

| | | |
|---|---|---|
| EP | 1803686 | 7/2007 |
| EP | 2221276 | 8/2010 |
| WO | WO 2001/30702 | 5/2001 |
| WO | WO 2002/40398 | 5/2002 |
| WO | WO 2004/103907 | 12/2004 |
| WO | WO 2008/083282 | 7/2008 |
| WO | WO 2011/082022 | 7/2011 |

OTHER PUBLICATIONS

W. B. Blumenthal, The Chemical Behavior of Zirconium, Chapter 8, "Carboxylates of Zirconium", pp. 311-338, D. Van Nostrand Company, Inc., Princeton, NJ, (1958).

Chaim, "Effect of Oxide Additives on Grain Growth During Sintering of Nanocrystalline Zirconia Alloys", Materials Letters, May 1998, vol. 35, pp. 245-250.

Dawson, "Hydrothermal Synthesis of Advanced Ceramic Powders", Ceramic Bulletin, 1988, vol. 67, No. 10, pp. 1673-1678.

Hakuta, "Hydrothermal Synthesis of Zirconia Nanocrystals in Supercritical Water", J. Materials Research, Aug. 2004, vol. 19, No. 8, pp. 2230-2234.

Hwang, "Grain Size Control of Tetragonal Zirconia Polycrystals Using the Space Charge Concept", Journal of the American Ceramic Society, Nov. 1990, vol. 73, No. 11, pp. 3269-3277.

Kim, "Lattice Parameters, Iconic Conductivities, and Solubility Limits in Fluorite-Structure $MO_2$ Oxide ($M=Hf^{4+}$, $Zr^{4+}$, $Ce^{4+}$, $Th^{4+}$, $U^{4+}$) Solid Solutions", Journal of the American Ceramic Society, 1989, vol. 72, No. 8, pp. 1415-1421.

Liu, "$La_2O_3$-modified YSZ Coatings: High-temperature Stability and Improved Thermal Barrier Properties", Surface & Coatings Technology, Jan. 15, 2009, vol. 203, No. 8, pp. 1014-1019.

Matsumoto, "Thermal Cycle Behavior of Plasma Sprayed $La_2O_3$, $Y_2O_3$ Stabilized $ZrO_2$ Coatings", Scripta Materialia, Jun. 2006, vol. 54, No. 12, pp. 2035-2039.

Ogihara, "Continuous Processing of Monodispersed Titania Powders", Journal of the American Ceramic Society, Sep. 1989, vol. 72, No. 9, pp. 1598-1601.

Speakman, "Development of Proton Conductors Using Pyrochlore-Perovskite Phase Boundaries", Journal of Materials Engineering and Performance, Jun. 2004, vol. 13, No. 3, pp. 303-308.

International Search Report for PCT/US2010/061539, 4 pages.

* cited by examiner

ZIRCONIA-BASED PARTICLES DOPED WITH A LANTHANIDE ELEMENT

CROSS REFERENCE TO RELATED APPLICATIONS

This application is a national stage filing under 35 U.S.C. 371 of PCT/US2010/061539, filed Dec. 21, 2010, which claims priority to U.S. Provisional Application No. 61/290,644, filed Dec. 29, 2009, the disclosure of which is incorporated by reference in its/their entirety herein.

TECHNICAL FIELD

Zirconia-based particles doped with a lanthanide element or doped with a combination of lanthanide element plus yttrium are described. Methods of making the zirconia-based particles and various uses of the zirconia-based particles are also described.

BACKGROUND

Zirconia-based materials have been used to prepare various ceramic materials. Compared to other ceramic materials, zirconia-based ceramics can have improved mechanical strength associated with a phase transformation mechanism that can be triggered when a crack propagates into the ceramic material. More specifically, tetragonal phase zirconia can be transformed to monoclinic phase zirconia under such conditions. The formation of the monoclinic phase tends to arrest the progression of the crack throughout the ceramic material.

Zirconia-based materials have been added to an organic matrix such as a polymeric material to increase the index of refraction or x-ray opacity of the organic matrix. The extent to which the x-ray opacity and/or refractive index of the organic matrix can be increased is dependent on the percent loading of zirconia-based materials in the organic matrix and on characteristics of the zirconia-based materials such as the amount of crystalline material, the crystalline structure, and the average particle size.

SUMMARY

Zirconia-based particles, sols containing the zirconia-based particles, methods of making the sols and the zirconia-based particles, composites containing the zirconia-based particles in an organic matrix, and sintered bodies prepared from the zirconia-based particles are described. More particularly, the zirconia-based particles are doped with a lanthanide element or with both a lanthanide element and yttrium. The zirconia-based particles are crystalline and have a primary particles size no greater than 100 nanometers.

In a first aspect, zirconia-based particles are provided. The zirconia-based particles contain (a) 0.02 to 20 mole percent of a lanthanide element oxide based on total moles of inorganic oxide in the zirconia-based particles and (b) 0 to 15 mole percent yttrium oxide based on total moles of inorganic oxide in the zirconia-based particles. The zirconia-based particles are crystalline and have an average primary particle size no greater than 100 nanometers.

In a second aspect, a sol is provided. The sol contains at least 3 weight percent zirconia-based particles dispersed, suspended, or a combination thereof in an aqueous medium. The zirconia-based particles contain (a) 0.02 to 20 mole percent of a lanthanide element oxide based on total moles of inorganic oxide in the zirconia-based particles and (b) 0 to 15 mole percent yttrium oxide based on total moles of inorganic oxide in the zirconia-based particles. The zirconia-based particles are crystalline and have an average primary particle size no greater than 100 nanometers.

In a third aspect, a method of making zirconia-based particles is provided. The method includes preparing a feedstock that contains multiple salts dissolved, suspended, or a combination thereof in an aqueous-based medium. The multiple salts include a zirconium salt, a lanthanide element salt, and an optional yttrium salt. The method further includes subjecting the feedstock to a hydrothermal treatment to form a sol containing at least 3 weight percent zirconia-based particles. The zirconia-based particles contain (a) 0.02 to 20 mole percent of a lanthanide element oxide based on total moles of inorganic oxide in the zirconia-based particles and (b) 0 to 15 mole percent yttrium oxide based on total moles of inorganic oxide in the zirconia-based particles. The zirconia-based particles are crystalline and have an average primary particle size no greater than 100 nanometers.

In a fourth aspect, a composite material is provided. The composite material includes zirconia-based particles dispersed, suspended, or a combination thereof in an organic matrix. The zirconia-based particles contain (a) 0.02 to 20 mole percent of a lanthanide element oxide based on total moles of inorganic oxide in the zirconia-based particles and (b) 0 to 15 mole percent yttrium oxide based on total moles of inorganic oxide in the zirconia-based particles. The zirconia-based particles are crystalline and have an average primary particle size no greater than 100 nanometers.

In a fifth aspect, a sintered body is provided. The sintered body is a product formed by sintering zirconia-based particles. The zirconia-based particles contain (a) 0.02 to 20 mole percent of a lanthanide element oxide based on total moles of inorganic oxide in the zirconia-based particles and (b) 0 to 15 mole percent yttrium oxide based on total moles of inorganic oxide in the zirconia-based particles. The zirconia-based particles are crystalline and have an average primary particle size no greater than 100 nanometers.

The above summary is not intended to describe each disclosed embodiment or implementation of the present invention. The Figures, Detailed Description Section, and Examples that follow more particularly exemplify these embodiments.

DETAILED DESCRIPTION

Figure 1:
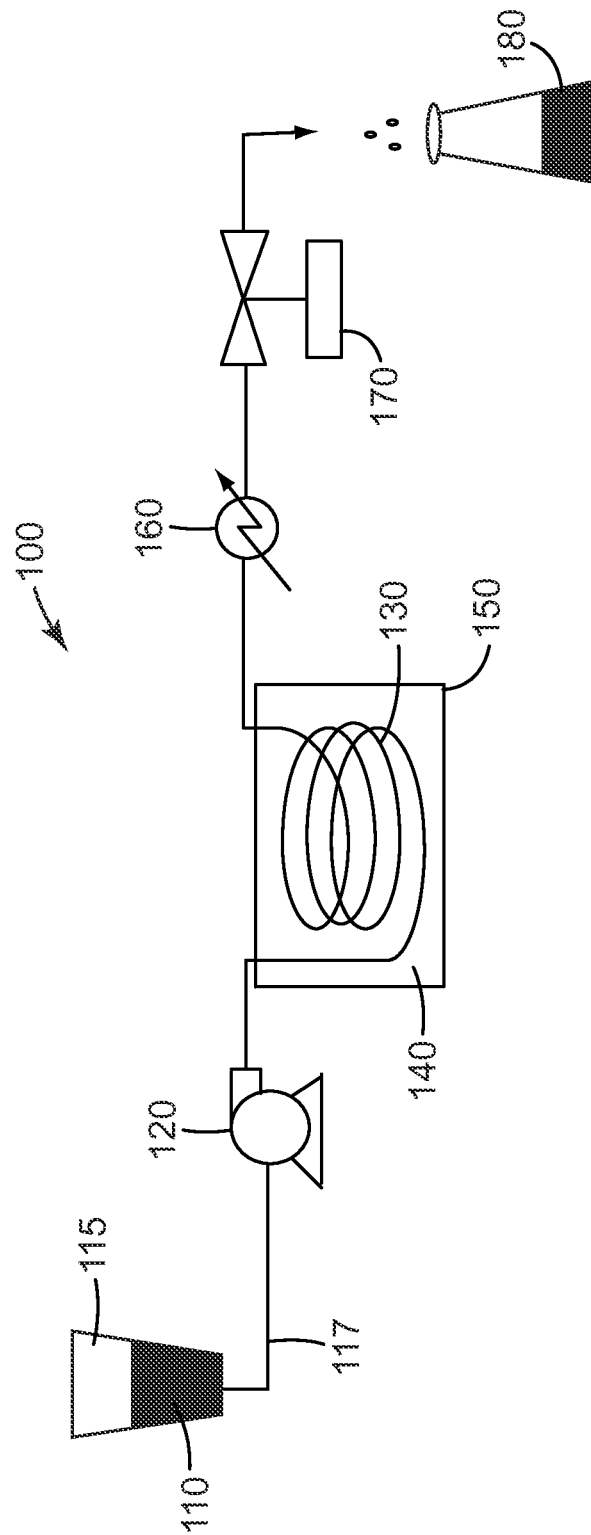
FIG. 1 is an exemplary schematic diagram of a continuous hydrothermal reactor system.

Zirconia-based particles are provided. These zirconia-based particles contain zirconium oxide doped with a lanthanide element (i.e., a lanthanide element oxide) or doped with a lanthanide element in addition to yttrium (i.e., yttrium oxide). The zirconia-based particles are prepared by subjecting a feedstock containing multiple salts in an aqueous medium to a hydrothermal treatment. The product of the hydrothermal treatment is a sol containing the zirconia-based particles. The sols are typically stable and the zirconia-based particles have an average primary particle size that is no greater than 100 nanometers. The zirconia-based particles can be isolated from the sol for use in various applications. For example, the zirconia-based particles can be used to form a sintered body or can be combined with an organic matrix to form a composite material.

Definitions

As used herein, the term "a", "an", and "the" are used interchangeably with "at least one" to mean one or more of the element being described.

As used herein, the term "zirconia" refers to various stoichiometric formulas for zirconium oxide. The most typical stoichiometeric formula is $ZrO_2$, which is generally referred to as either zirconium oxide or zirconium dioxide.

As used herein, the term "zirconia-based" means that the majority of the material is zirconia. For example, at least 70 mole percent, at least 75 mole percent, at least 80 mole percent, at least 85 mole percent, at least 90 mole percent, at least 95 mole percent, or at least 98 mole percent of the particles or ceramic material is zirconia. The zirconia is typically doped with other inorganic oxides such as a lanthanide element oxide and optionally yttrium oxide. Various organic molecules can be sorbed on the surface of the material.

As used herein, the term "inorganic oxide" includes, but is not limited to, oxides of various inorganic elements such as, for example, zirconium oxide, yttrium oxide, and oxides of various lanthanide elements.

As used herein, the term "lanthanide element" refers to an element in the lanthanide series of the periodic table of elements. The lanthanide series have an atomic number 57 (for lanthanum) to 71 (for lutetium). Elements included in this series are lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

As used herein, the term "in the range" includes the endpoints of the range and all numbers between the endpoints. For example, in the range of 1 to 10 includes the numbers 1 and 10 as well as all numbers between 1 and 10.

As used herein, the term "associated" refers to a grouping of two or more primary particles that are aggregated and/or agglomerated. Similarly, the term "non-associated" refers to two or more primary particles that are free or substantially free from aggregation and/or agglomeration.

As used herein, the term "aggregation" refers to a strong association of two or more primary particles. For example, the primary particles may be chemically bound to one another. The breakdown of aggregates into smaller particles (e.g., primary particles) is generally difficult to achieve.

As used herein, the term "agglomeration" refers to a weak association of two or more primary particles. For example, the primary particles may be held together by charge or polarity. The breakdown of agglomerates into smaller particles (e.g., primary particles) is less difficult than the breakdown of aggregates into smaller particles.

As used herein, the term "primary particle size" refers to the size of a non-associated single crystal zirconia particle. X-ray Diffraction (XRD) is typically used to measure the primary particle size using the techniques described herein.

As used herein, the term "hydrothermal" refers to a method of heating an aqueous medium to a temperature above the normal boiling point of the aqueous medium at a pressure that is equal to or greater than the pressure required to prevent boiling of the aqueous medium.

As used herein, the term "stable" in reference to a sol means that no more than 5 weight percent of the particles within the sol precipitate when the sol is stored for at least one week at room temperature (e.g., 20° C. to 25° C.). For example, less than 5 weight percent, less than 4 weight percent, less than 3 weight percent, less than 2 weight percent, less than 1 weight percent, or less than 0.5 weight percent of the particles within the sol precipitate under these storage conditions.

As used herein, the term "organic matrix" refers to any organic compound or mixture of such compounds. The organic matrix often includes one or more organic solvents, one or more monomers, one or more oligomers, one or more polymeric materials, or a combination thereof. In many embodiments, the organic matrix is an organic solvent, a polymerizable composition, or a polymerized composition.

Zirconia-based particles are provided that are doped with a lanthanide element or doped with a lanthanide element in combination with yttrium. More specifically, the zirconia-based particles contain (a) 0.02 to 20 mole percent of a lanthanide element oxide based on total moles of inorganic oxide in the zirconia-based particles and (b) 0 to 15 mole percent yttrium oxide based on total moles of inorganic oxide in the zirconia-based particles. The zirconia-based particles are crystalline and have an average primary particle size no greater than 100 nanometers.

The zirconia-based particles are doped with 0.02 to 20 mole percent of a lanthanide element oxide based on the total moles of inorganic oxide in the zirconia-based particles. The presence of the lanthanide element can serve various functions. For example, if lanthanum is chosen as the lanthanide element, the lanthanum can function to control the grain size of a sintered body prepared from the zirconia-based particles. Other lanthanide elements such as, for example, europium, erbium, thulium, neodymium, cerium, samarium, and terbium can be added to provide particles (i.e., particles that have an average primary particle size less than 100 nanometers) that are fluorescent.

Any amount of the lanthanide element that is sufficient to produce the desired effect can be added to the zirconia-based particles. The zirconia-based particles typically contain at least 0.02 mole percent of the lanthanide element oxide based on the total moles of inorganic oxides in the zirconia-based particles. In many embodiments, the lanthanide element oxide is present in an amount equal to at least 0.05 mole percent, at least 0.1 mole percent, at least 0.2 mole percent, at least 0.5 mole percent, at least 1 mole percent, or at least 2 mole percent.

As the amount of the lanthanide element is increased in the zirconia-based particles, a concentration is typically reached beyond which the desired effect is not further enhanced by the addition of more lanthanide element. Additionally, if the concentration is too high, a separate phase of the lanthanide element oxide can be detected using a technique such as x-ray diffraction. A separate phase can be undesirable for some applications. The zirconia-based particles typically contain no greater than 20 mole percent lanthanide element oxide based on the total moles of inorganic oxides in the zirconia-based particles. In many embodiments, the lanthanide element oxide is present in an amount no greater than 15 mole percent, no greater than 12 mole percent, no greater than 10 mole percent, no greater than 7 mole percent, or no greater than 5 mole percent based on the total moles of inorganic oxides in the zirconia-based particles.

In some embodiments, the zirconia-based particles contain 0.02 to 20 mole percent, 0.02 to 15 mole percent, 0.02 to 10 mole percent, 0.02 to 5 mole percent, 0.05 to 20 mole percent, 0.05 to 15 mole percent, 0.05 to 10 mole percent, 0.1 to 15 mole percent, 0.1 to 10 mole percent, 0.1 to 7 mole percent, 0.1 to 5 mole percent, 0.5 to 10 mole percent, 0.5 to 7 mole percent, 0.5 to 5 mole percent, 1 to 10 mole percent, 1 to 7 mole percent, 1 to 5 mole percent, or 1 to 3 mole percent lanthanide element oxide based on the total moles of inorganic oxide. The lanthanide element oxide can be from a single lanthanide element or from more than one lanthanide elements.

The zirconia-based particles can optionally contain yttrium. Any yttrium that is present is typically in the form of yttrium oxide. The presence of yttrium in the zirconia-based particle usually facilitates the formation of the cubic and/or tetragonal phases rather than the monoclinic phase. The cubic and/or tetragonal phases are often preferred because they tend to have a higher refractive index and x-ray opacity compared to the monoclinic phase. These phases also tend to be more symmetrical, which can be an advantage if the zirconia-based particles are dispersed in an organic matrix. Such particles tend to have a minimal effect on the viscosity of the organic matrix. Additionally, the percent loading of the zirconia-based particles in the organic matrix often can be higher with the cubic and/or tetragonal phases.

When the zirconia-based particles are used to prepare sintered bodies, the presence of yttrium oxide can enhance the stability of the metastable tetragonal phase. If the amount of the yttrium oxide included in the zirconia-based particles is too low, a greater amount of the monoclinic phase tends to form during cooling of the sintered body from the sintering temperature to room temperature. Stress related to volume expansion associated with the transformation from the tetragonal phase to the monoclinic phase can spontaneously fracture the sintered body while cooling.

If yttrium oxide is included in the zirconia-based particles, the concentration is often at least 0.1 mole percent, at least 0.2 mole percent, at least 0.5 mole percent, at least 1 mole percent, or at least 1.5 mole percent. The concentration is based on the total moles of inorganic material in the zirconia-based particles.

The upper concentration of yttrium oxide included in the zirconia-based particles is often selected so that no separate phase for yttrium oxide can be detected using techniques such as x-ray diffraction. Also, if the zirconia-based particles are used to form sintered bodies, the upper concentration of yttrium oxide is often selected so that tetragonal phase is not so stable that the resulting sintered body is prevented from undergoing transformation toughening when subjected to stress after formation (i.e., after sintering and cooling to room temperature). That is, the yttrium oxide level is chosen to allow some monoclinic phase formation when the sintered body is fractured during use.

If yttrium oxide is included in the zirconia-based particles, the concentration can be up to 15 mole percent, up to 10 mole percent, up to 8 mole percent, up to 7 mole percent, up to 6 mole percent, up to 5 mole percent, up to 4 mole percent, up to 3 mole percent, or up to 2.5 mole percent. These concentrations are based on the total moles of inorganic oxide in the zirconia-based particles.

In some embodiments, the zirconia-based particles contain 0.1 to 15 mole percent, 1 to 15 mole percent, 5 to 15 mole percent, 8 to 15 mole percent, 0.1 to 10 mole percent, 0.1 to 7 mole percent, 0.1 to 5 mole percent, 0.5 to 5 mole percent, 1 to 10 mole percent, 1 to 7 mole percent, 1 to 5 mole percent, or 1.5 to 5 mole percent yttrium oxide based on the total moles of inorganic oxide in the zirconia-based particles.

Some zirconia-based particles that are not doped with yttrium oxide contain 0.05 to 15 mole percent lanthanide element oxide and 85 to 99.95 mole percent zirconium oxide, 0.05 to 10 mole percent lanthanide element oxide and 90 to 99.95 mole percent zirconium oxide, 0.1 to 10 mole percent lanthanide element oxide and 90 to 99.9 mole percent zirconium oxide, 0.5 to 10 mole percent lanthanide element oxide and 90 to 99.5 mole percent zirconium oxide, 1 to 10 mole percent lanthanide element oxide and 90 to 99 mole percent zirconium oxide, 1 to 7 mole percent lanthanide element oxide and 93 to 99 mole percent zirconium oxide, or 1 to 5 mole percent lanthanide element oxide and 95 to 99 mole percent zirconium oxide. These concentrations are based on the total moles of inorganic oxide in the zirconia-based particles.

Some zirconia-based particles that are doped with yttrium oxide contain 0.05 to 15 mole percent lanthanide element oxide, 0.1 to 15 mole percent yttrium oxide, and 70 to 99.85 mole percent zirconium oxide. Other such particles contain 0.05 to 10 mole percent lanthanide element oxide, 0.1 to 15 mole percent yttrium oxide, and 75 to 99.85 mole percent zirconium oxide. Still other particles contain 0.1 to 10 mole percent lanthanide element oxide, 1 to 15 mole percent yttrium oxide, and 75 to 98.9 mole percent zirconium oxide. Other particles contain 1 to 10 mole percent lanthanide element oxide, 1 to 10 mole percent yttrium oxide, and 80 to 98 mole percent zirconium oxide. Still other particles contain 1 to 7 mole percent lanthanide element oxide, 1 to 7 weight percent yttrium oxide, and 86 to 98 mole percent zirconium oxide. Yet other particles contain 1 to 5 mole percent lanthanide element oxide, 1 to 10 mole percent yttrium oxide, and 85 to 98 mole percent zirconium oxide. Other particles contain 0.5 to 5 mole percent lanthanide element oxide, 5 to 15 mole percent yttrium oxide, and 80 to 94.5 weight percent zirconium oxide. Other particles contain 1 to 3 mole percent lanthanide element oxide, 8 to 15 mole percent yttrium oxide, and 82 to 91 weight percent zirconium oxide. Other particles contain 1 to 3 mole percent lanthanide element oxide, 8 to 15 mole percent yttrium oxide, and 82 to 91 mole percent zirconium oxide. The concentrations are based on the total moles of inorganic oxide in the zirconia-based particles.

Depending on how the zirconia-based particles are prepared, the particles can contain at least some organic material in addition to the inorganic oxides. If the particles are prepared using the hydrothermal technology described herein, there can be some organic material attached to the surface of the zirconia-based particles that originates from the carboxylate species (anion, acid, or both) included in the feedstock or formed as a byproduct of the hydrolysis and condensation reactions. That is, organic material is often sorbed on the surface of the zirconia-based particles. For example, the zirconia-based particles can contain up to 15 weight percent, up to 12 weight percent, up to 10 weight percent, up to 8 weight percent, or up to 6 weight percent organic material based on the weight of the particles.

The zirconia in the zirconia-based ceramic particles is crystalline. That is, the zirconia-based particles are crystalline. The crystalline material is cubic, tetragonal, monoclinic, or a combination thereof. Because the cubic and tetragonal phases are difficult to differentiate using x-ray diffraction techniques, these two phases are typically combined for quantitative purposes and are referred to as the cubic/tetragonal phase. The term "cubic/tetragonal" or "C/T" are used interchangeably to refer to the cubic plus the tetragonal crystalline phases. The percent cubic/tetragonal phase can be determined, for example, by measuring the peak area of the x-ray diffraction peaks for each phase and using Equation (I).

$$\% \ C/T = 100(C/T) \div (C/T+M) \qquad (I)$$

In Equation (I), C/T refers to the peak area of the diffraction peak for the cubic/tetragonal phase, M refers to the peak area of the diffraction peak for the monoclinic phase, and % C/T refers to the weight percent cubic/tetragonal crystalline phase. The details of the x-ray diffraction measurements are described more fully in the Example section below.

Typically, at least 50 weight percent of the zirconia-based particles are present in the cubic or tetragonal crystal structure (i.e., cubic crystal structure, tetragonal crystal structure, or a combination thereof). In some embodiments, at least 55 weight percent, at least 60 weight percent, at least 70 weight percent, at least 80 weight percent, at least 90 weight percent, or at least 95 weight percent of the zirconia-based particles are present in the cubic or tetragonal crystal structure. A greater content of the cubic/tetragonal phase is often desired.

For example, cubic/tetragonal crystals tend to promote the formation of low aspect ratio primary particles having a cube-like shape when viewed under an electron microscope. This particle shape tends to be easily dispersed into an organic matrix. Additionally, when formed into a sintered body, zirconia-based material that is present in the cubic/tetragonal phase can undergo transformation toughening when fractured. That is, a portion of the cubic/tetragonal phase material can be transformed to monoclinic phase material in the region of the fracture. The monoclinic phase material tends to occupy a larger volume than the cubic/tetragonal phase material. This transformation tends to arrest the propagation of the fracture.

The zirconia particles usually have an average primary particle size no greater than 100 nanometers. In many embodiments, the average primary particle size is no greater than 90 nanometers, no greater than 75 nanometers, no greater than 60 nanometers, no greater than 50 nanometers, no greater than 40 nanometers, no greater than 30 nanometer, no greater than 25 nanometers, no greater than 20 nanometers, or no greater than 15 nanometers. The average primary particle size, which refers to the non-associated particle size of the zirconia particles, can be determined by x-ray diffraction as described in the Example section.

The extent of association between the primary particles can be determined from the volume-average particle size. The volume-average particle size can be measured using Photon Correlation Spectroscopy as described in more detail in the Examples section below. Briefly, the volume distribution (percentage of the total volume corresponding to a given size range) of the particles is measured. The volume of a particle is proportional to the third power of the diameter. The volume-average size is the size of a particle that corresponds to the mean of the volume distribution. If the zirconia-based particles are associated, the volume-average particle size provides a measure of the size of the aggregates and/or agglomerates of primary particles. If the particles of zirconia are non-associated, the volume-average particle size provides a measure of the size of the primary particles. The zirconia-based particles typically have a volume-average size that is no greater than 50 nanometers, no greater than 40 nanometers, no greater than 30 nanometers, no greater than 25 nanometers, no greater than 20 nanometers, or no greater than 15 nanometers.

A quantitative measure of the degree of association between the primary particles in the zirconia sol is the dispersion index. As used herein the "dispersion index" is defined as the volume-average particle size divided by the primary particle size. The primary particle size (e.g., the weighted average crystallite size) is determined using x-ray diffraction techniques and the volume-average particle size is determined using Photon Correlation Spectroscopy. As the association between primary particles decreases, the dispersion index approaches a value of 1 but can be somewhat higher or lower. The zirconia-based particles typically have a dispersion index of about 1 to 7, about 1 to 5, about 1 to 4, about 1 to 3, about 1 to 2.5, or about 1 to 2.

Photon Correlation Spectroscopy also can be used to calculate the Z-average particle size. The Z-average size is calculated from the fluctuations in the intensity of scattered light using a cumulants analysis and is proportional to the sixth power of the particle diameter. The volume-average size will typically be a smaller value than the Z-average size. The zirconia particles tend to have a Z-average size that is no greater than 70 nanometers, no greater than 60 nanometers, no greater than 50 nanometers, no greater than 40 nanometers, no greater than 35 nanometers, or no greater than 30 nanometers.

Although any known method can be used to provide the zirconia-based particles, these particles are often prepared using hydrothermal technology. The method includes preparing a feedstock that contains multiple salts dissolved, suspended, or a combination thereof in an aqueous-based medium. The multiple salts include a zirconium salt, a lanthanide element salt, and an optional yttrium salt. The method further includes subjecting the feedstock to a hydrothermal treatment to form a zirconia-based sol containing at least 3 weight percent zirconia-based particles. The zirconia-based particles are the same as described above.

The zirconium salt, the lanthanide element salt, and any other optional salts such as a yttrium salt included in the feedstock are typically selected to be soluble in an aqueous medium. Stated differently, the multiple salts are typically dissolved in the aqueous medium. The aqueous medium includes water or a mixture of water with other water soluble or water miscible materials. The salts are also typically selected to be removable during subsequent processing steps and to be non-corrosive.

At least a majority of the dissolved salts in the feedstock are usually carboxylate salts rather than halide salts, oxyhalide salts, nitrate salts, or oxynitrate salts. Halide and nitrate anions in the feedstock tend to result in the formation of zirconia-based particles that are predominately of a monoclinic phase rather than the more desirable tetragonal or cubic phases. Further, carboxylates and/or acids thereof tend to be more compatible with an organic matrix material compared to halides and nitrates. Although any carboxylate anion can be used, the carboxylate anion often has no greater than 4 carbon atoms such as, for example, formate, acetate, propionate, butyrate, or a combination thereof. The dissolved salts are often acetate salts. The feedstock can further include the corresponding carboxylic acid of the carboxylate anion. For example, feedstocks prepared from acetate salts often contain acetic acid.

In many embodiments, the dissolved zirconium salt is zirconium acetate salt. Zirconium acetate can be represented by a formula such as $ZrO_{((4-n)/2)}{}^{n+}(CH_3COO^-)_n$ where n is in the range of 1 to 2. The zirconium ion may be present in a variety of structures depending, for example, on the pH of the feedstock. Methods of making zirconium acetate are described, for example, in W. B. Blumenthal, "The Chemical Behavior of Zirconium," pp. 311-338, D. Van Nostrand Company, Princeton, N.J. (1958). Suitable aqueous solutions of zirconium acetate are commercially available, for example, from Magnesium Elektron, Inc. (Flemington, N.J.) that contain up to 17 weight percent zirconium, up to 18 weight percent zirconium, up to 20 weight percent zirconium, up to 22 weight percent, up to 24 weight percent, up to 26 weight percent, or up to 28 weight percent zirconium based on the total weight of the solution.

Similarly, the lanthanide element salt and the optional yttrium salt often have a carboxylate anion. These salts are commercially available from a variety of manufacturers. Because these salts are typically used at much lower concentration levels than the zirconium salt, however, salts other than carboxylate salts (e.g., acetate salts) can be selected. For example, any of these salts can be a nitrate salt.

The total amount of the various salts dissolved in the feedstock can be readily determined based on the total percent solids selected for the feedstock. The relative amounts of the various salts can be calculated to provide the selected composition for the zirconia-based particles.

The pH of the feedstock is typically acidic. For example, the pH is usually less than 6, less than 5, or less than 4. The pH often is in the range of 3 to 4.

The liquid phase of the feedstock is typically predominantly water (i.e., the liquid phase is an aqueous based medium). This water is preferably deionized to minimize the introduction of alkali metal ions, alkaline earth ions, or both into the feedstock. Water-miscible organic co-solvents can be included in the liquid phase in amounts up 20 weight percent based on the weight of the liquid phase. Suitable co-solvents include, but are not limited to, 1-methoxy-2-propanol, ethanol, isopropanol, ethylene glycol, N,N-dimethylacetamide, and N-methylpyrrolidone.

Usually, the feedstock is a solution and does not contain dispersed or suspended solids. For example, seed particles usually are not present in the feedstock. The feedstock often contains greater than 5 weight percent solids and these solids are typically dissolved. As used herein, the "weight percent solids" is calculated by drying a sample at 120° C. and refers the portion of the feedstock that is not water, a water-miscible co-solvent, or another compound that can be vaporized at temperatures up to 120° C. The weight percent solids is equal to $$100(\text{dry weight}) \div (\text{wet weight}).$$

In this equation, the term "wet weight" refers to the weight of a feedstock sample before drying and the term "dry weight" refers to the weight of the sample after drying, for example, at 120° C. for at least 30 minutes. If the feedstock has percent solids greater than 5 weight percent, the resulting zirconia-based particles are typically non-associated. Surprisingly, however, if the feedstock has percent solids equal to or less than 5 weight percent, the resulting zirconia-based particles are typically associated. This is unexpected because the conventional approach to forming non-associated particles is to lower the concentration of the reactants introduced into a hydrothermal reactor.

In many embodiments, the feedstock contains greater than 5 weight percent, greater than 10 weight percent, greater than 12 weight percent, or greater than 15 weight percent solids. Some feedstocks contain up to 25 weight percent solids or higher. For example, the feedstock can contain up to 24 weight percent, up to 22 weight percent, up to 20 weight percent, or up to 19 weight percent solids. Some exemplary feedstocks have solids in the range of 10 to 25 weight percent, 12 to 22 weight percent, 14 to 20 weight percent, or 15 to 19 weight percent.

When subjected to hydrothermal treatment, the various dissolved salts in the feedstock undergo hydrolysis and condensation reactions to form the zirconia-based particles. These reactions are often accompanied with the release of an acidic byproduct. That is, the byproduct is often one or more carboxylic acids corresponding to the zirconium carboxylate salt plus any other carboxylate salt in the feedstock. For example, if the salts are acetate salts, acetic acid is formed as a byproduct of the hydrothermal reaction.

Any suitable hydrothermal reactor can be used for the preparation of the zirconia-based particles. The reactor can be a batch or continuous reactor. The heating times are typically shorter and the temperatures are typically higher in a continuous hydrothermal reactor compared to a batch hydrothermal reactor. The time of the hydrothermal treatments can be varied depending on the type of reactor, the temperature of the reactor, and the concentration of the feedstock. The pressure in the reactor can be autogeneous (i.e., the vapor pressure of water at the temperature of the reactor), can be hydraulic (i.e., the pressure caused by the pumping of a fluid against a restriction), or can result from the addition of an inert gas such as nitrogen or argon. Suitable batch hydrothermal reactors are available, for example, from Parr Instruments Co. (Moline, Ill.). Some suitable continuous hydrothermal reactors are described, for example, in U.S. Pat. Nos. 5,453,262 (Dawson et al.) and 5,652,192 (Matson et al.); Adschiri et al., *J. Am. Ceram. Soc.*, 75, 1019-1022 (1992); and Dawson, *Ceramic Bulletin*, 67 (10), 1673-1678 (1988).

If a batch reactor is used to form zirconia-based particles, the temperature is often in the range of 160° C. to 275° C., in the range of 160° C. to 250° C., in the range of 170° C. to 250° C., in the range of 175° C. to 250° C., in the range of 200° C. to 250° C., in the range of 175° C. to 225° C., in the range of 180° C. to 220° C., in the range of 180° C. to 215° C., or in the range of 190° C. to 210° C. The feedstock is typically placed in the batch reactor at room temperature. The feedstock within the batch reactor is heated to the designated temperature and held at that temperature for at least 30 minutes, at least 1 hour, at least 2 hours, or at least 4 hours. The temperature can be held up to 24 hours, up to 20 hours, up to 16 hours, or up to 8 hours. For example, the temperature can be held in the range of 0.5 to 24 hours, in the range of 1 to 18 hours, in the range of 1 to 12 hours, or in the range of 1 to 8 hours. Any size batch reactor can be used. For example, the volume of the batch reactor can be in a range of several milliliters to several liters or more.

In many embodiments, the feedstock is passed through a continuous hydrothermal reactor. As used herein, the term "continuous" with reference to the hydrothermal reactor system means that the feedstock is continuously introduced and an effluent is continuously removed from the heated zone. The introduction of feedstock and the removal of the effluent typically occur at different locations of the reactor. The continuous introduction and removal can be constant or pulsed.

One exemplary continuous hydrothermal reactor system 100 is shown schematically in FIG. 1. The feedstock 110 is contained within a feedstock tank 115. The feedstock tank is connected with tubing or piping 117 to a pump 120. Similar tubing or piping can be used to connect other components of the tubular reactor system. The tubing or piping 117 can be constructed of any suitable material such as metal, glass, ceramic, or polymer. The tubing or piping 117 can be, for example, polyethylene tubing or polypropylene tubing in the portions of the continuous hydrothermal reactor system 100 that are not heated and that are not under high pressure. Any tubing that is heated or under pressure is often made of metal (e.g., stainless steel, carbon steel, titanium, nickel, or the like) or has a metal outer housing. The pump 120 is used to introduce the feedstock 110 into the tubular reactor 130. That is, the pump 120 is connected to the inlet of the tubular reactor 130. Any type of pump 120 can be used that is capable of pumping against the pressure within the tubular reactor 130. The pump can provide a constant or pulsed flow of the feedstock solution into the tubular reactor 130.

As used herein, the term "tubular reactor" refers to the portion of the continuous hydrothermal reactor system that is heated (i.e., the heated zone). Although the tubular reactor 130 is shown in FIG. 1 as a coil of tubing, the tubular reactor can be in any suitable shape. The shape of the tubular reactor is often selected based on the desired length of the tubular reactor and the method used to heat the tubular reactor. For example, the tubular reactor can be straight, U-shaped, or coiled. The interior portion of the tubular reactor can be empty or can contain baffles, balls, or other known mixing means.

As shown in FIG. 1, the tubular reactor 130 is placed in a heating medium 140 within a heating medium vessel 150. The heating medium 140 can be, for example, an oil, sand, salt, or the like that can be heated to a temperature above the hydrolysis and condensation temperatures of the zirconium. Suitable oils include, for example, plant oils such as peanut oil and canola oil. Some plant oils are preferably kept under nitrogen when heated to prevent or minimize oxidation of the oils. Other suitable oils include polydimethylsiloxanes such as those commercially available from Duratherm Extended Fluids (Lewiston, N.Y.) under the trade designation "DURATHERMS". Suitable salts include, for example, sodium nitrate, sodium nitrite, potassium nitrate, or mixtures thereof. The heating medium vessel 150 can be any suitable container that can hold the heating medium and that can withstand the heating temperatures used for the tubular reactor 130. The heating medium vessel 150 can be heated using any suitable means. In many embodiments, the heating medium vessel 150 is positioned inside an electrically heated coil. Alternatively, other types of heaters such as, for example, induction heaters, microwave heaters, fuel-fired heaters, heating tape, and steam coils can be used in place of the heating vessel 150, the heating medium 140, or both.

The tubular reactor 130 can be made of any material capable of withstanding the temperatures and pressures used to prepare zirconia particles. The tubular reactor 130 preferably is constructed of a material that can resist dissolution in an acidic environment. For example, carboxylic acids can be present in the feedstock or can be produced as a reaction byproduct within the continuous hydrothermal reactor system. In some exemplary embodiments, the tubular reactor is made of stainless steel, nickel, titanium, carbon-based steel, or the like.

In other exemplary embodiments, an interior surface of the tubular reactor contains a fluorinated polymeric material. This fluorinated polymeric material can include, for example, a fluorinated polyolefin. In some embodiments, the polymeric material is polytetrafluoroethylene (PTFE) such as TEFLON, which is a trade designation of DuPont (Wilmington, Del.). Some tubular reactors have a fluorinated polymeric hose such as a TEFLON hose within a metal housing such as a braided stainless steel housing. The fluorinated polymeric surface is particularly advantageous for use with feedstocks and/or reaction products that contain carboxylic acids. These carboxylic acids can leach metals from some known hydrothermal reactors such as those constructed of stainless steel.

The second end of the tubular reactor 130 is usually connected to a cooling device 160. Any suitable cooling device 160 can be used. In some embodiments, the cooling device 160 is a heat exchanger that includes a section of tubing or piping that has an outer jacket filled with a cooling medium such as cool water. In other embodiments, the cooling device 160 includes a coiled section of tubing or piping that is placed in a vessel that contains cooling water. In either of these embodiments, the tubular reactor effluent is passed through the section of tubing and is cooled from the tubular reactor temperature to a temperature no greater than 100° C., no greater than 80° C., no greater than 60° C., or no greater than 40° C. Other cooling devices that contain dry ice or refrigeration coils can also be used. After cooling, the reactor effluent can be discharged into a product collection vessel 180. The reactor effluent is preferably not cooled below the freezing point prior to being discharged into the product collection vessel 180.

The pressure inside the tubular reactor can be at least partially controlled with a backpressure valve 170, which is generally positioned between the cooling device 160 and the sample collection vessel 180. The backpressure valve 170 controls the pressure at the exit of the continuous hydrothermal reactor system 100 and helps to control the pressure within the tubular reactor 130. The backpressure is often at least 100 pounds per square inch (0.7 MPa), at least 200 pounds per square inch (1.4 MPa), at least 300 pounds per square inch (2.1 MPa), at least 400 pounds per square inch (2.8 MPa), at least 500 pounds per square inch (3.5 MPa), at least 600 pounds per square inch (4.2 MPa), or at least 700 pounds per square inch (4.9 MPa). The backpressure should be high enough to prevent boiling within the tubular reactor.

The dimensions of the tubular reactor 130 can be varied and, in conjunction with the flow rate of the feedstock, can be selected to provide suitable residence times for the reactants within the tubular reactor. Any suitable length tubular reactor can be used provided that the residence time and temperature are sufficient to convert the zirconium in the feedstock to zirconia-based particles. The tubular reactor often has a length of at least 0.5 meter, at least 1 meter, at least 2 meters, at least 5 meters, at least 10 meters, at least 15 meters, at least 20 meters, at least 30 meters, at least 40 meters, or at least 50 meters. The length of the tubular reactor in some embodiments is less than 500 meters, less than 400 meters, less than 300 meters, less than 200 meters, less than 100 meters, less than 80 meters, less than 60 meters, less than 40 meters, or less than 20 meters.

Tubular reactors with a relatively small inner diameter are typically preferred. For example, tubular reactors having an inner diameter no greater than about 3 centimeters are often used because of the fast rate of heating of the feedstock that can be achieved with these reactors. Also, the temperature gradient across the tubular reactor is less for reactors with a smaller inner diameter compared to those with a larger inner diameter. The larger the inner diameter of the tubular reactor, the more this reactor resembles a batch reactor. However, if the inner diameter of the tubular reactor is too small, there is an increased likelihood of the reactor becoming plugged or partially plugged during operation resulting from deposition of material on the walls of the reactor. The inner diameter of the tubular reactor is often at least 0.1 centimeters, at least 0.15 centimeters, at least 0.2 centimeters, at least 0.3 centimeters, at least 0.4 centimeters, at least 0.5 centimeters, or at least 0.6 centimeters. In some embodiments, the diameter of the tubular reactor is no greater than 3 centimeters, no greater than 2.5 centimeters, no greater than 2 centimeters, no greater than 1.5 centimeters, or no greater than 1.0 centimeters. Some tubular reactors have an inner diameter in the range of 0.1 to 3.0 centimeters, in the range of 0.2 to 2.5 centimeters, in the range of 0.3 to 2 centimeters, in the range of 0.3 to 1.5 centimeters or in the range of 0.3 to 1 centimeters.

In a continuous hydrothermal reactor, the temperature and the residence time are selected in conjunction with the tubular reactor dimensions to convert at least 90 mole percent of the zirconium in the feedstock to zirconia-based particles using a single hydrothermal treatment. That is, at least 90 mole percent of the dissolved zirconium in the feedstock is converted to zirconia-based particles within a single pass through the continuous hydrothermal reactor system.

Alternatively, a multiple step hydrothermal process can be used. For example, the feedstock can be subjected to a first hydrothermal treatment to form a zirconium-containing intermediate and a by-product such as a carboxylic acid. A second feedstock can be formed by removing at least a portion of the by-product of the first hydrothermal treatment from the zirconium-containing intermediate. The second feedstock can then be subjected to a second hydrothermal treatment to form a sol containing the zirconia-based particles. This process is further described in U.S. Pat. No. 7,241,437 (Davidson et al.).

If a two step hydrothermal process is used, the percent conversion of the zirconium-containing intermediate is typically 40 to 75 mole percent. The conditions used in the first hydrothermal treatment can be adjusted to provide conversion within this range. Any suitable method can be used to remove at least part of the by-product of the first hydrothermal treatment. For example, carboxylic acids such as acetic acid can be removed by a variety of methods such as vaporization, dialysis, ion exchange, precipitation, filtration, and the like.

When referring to a continuous hydrothermal reactor, the term "residence time" means the average length of time that the feedstock is within the heated portion of the continuous hydrothermal reactor system. For the reactor depicted in FIG. 1, the residence time is the average time the feedstock is within the tubular reactor 130 and is equal to the volume of the tubular reactor divided by the flow rate of the feedstock through the tubular reactor. The residence time in the tubular reactor can be varied by altering the length or diameter of the tubular reactor as well as by altering the flow rate of the feedstock. In many embodiments, the residence time is at least 1 minute, at least 2 minutes, at least 4 minutes, at least 6 minutes, at least 8 minutes, or at least 10 minutes. The residence time is typically no greater than 240 minutes, no greater than 180 minutes, no greater than 120 minutes, no greater than 90 minutes, no greater than 60 minutes, no greater than 45 minutes, or no greater than 30 minutes. In many examples, the residence time is in the range of 1 to 240 minutes, in the range of 1 to 180 minutes, in the range of 1 to 120 minutes, in the range of 1 to 90 minutes, in the range of 1 to 60 minutes, in the range of 10 to 90 minutes, in the range of 10 to 60 minutes, in the range of 20 to 60 minutes, or in the range of 30 to 60 minutes.

Any suitable flow rate of the feedstock through the tubular reactor can be used as long as the residence time is sufficiently long to convert the dissolved zirconium to zirconia-based particles. That is, the flow rate is often selected based on the residence time needed to convert the zirconium in the feedstock to zirconia-based particles. Higher flow rates are desirable for increasing throughput and for minimizing the deposition of materials on the walls of the tubular reactor. A higher flow rate can often be used when the length of the reactor is increased or when both the length and diameter of the reactor are increased. The flow through the tubular reactor can be either laminar or turbulent.

In some exemplary continuous hydrothermal reactors, the reactor temperature is in the range of 170° C. to 275° C., in the range of 170° C. to 250° C., in the range of 170° C. to 225° C., in the range of 180° C. to 225° C., in the range of 190° C. to 225° C., in the range of 200° C. to 225° C., or in the range of 200° C. to 220° C. If the temperature is greater than about 275° C., the pressure may be unacceptably high for some hydrothermal reactors systems. However, if the temperature is less than about 170° C., the conversion of the zirconium in the feedstock to zirconia-based particles may be less than 90 weight percent using typical residence times.

The effluent of the hydrothermal treatment (i.e., the product of the hydrothermal treatment) is a zirconia-based sol. As used herein, the term "sol" refers to a dispersion or suspension of the zirconia-based particles in an aqueous-based medium. The sol contains at least 3 weight percent zirconia-based particles dispersed, suspended, or a combination thereof in an aqueous medium. The zirconia-based particles contain (a) 0.02 to 20 mole percent of a lanthanide element oxide based on total moles of inorganic oxide in the zirconia-based particles and (b) 0 to 15 mole percent yttrium oxide based on total moles of inorganic oxide in the zirconia-based particles. The zirconia-based particles are crystalline and have an average primary particle size no greater than 100 nanometers.

The sol effluent of the hydrothermal treatment usually contains non-associated zirconia-based particles. The effluent is typically clear or slightly cloudy. In contrast, zirconia-based sols that contain agglomerated or aggregated particles usually tend to have a milky or cloudy appearance. The zirconia-based sols often have a high optical transmission due to the small size and non-associated form of the primary zirconia particles in the sol. High optical transmission of the sol can be desirable in the preparation of transparent or translucent composite materials. As used herein, "optical transmission" refers to the amount of light that passes through a sample (e.g., a zirconia-based sol) divided by the total amount of light incident upon the sample. The percent optical transmission may be calculated using the equation $$100(I/I_O)$$

where I is the light intensity passing though the sample and $I_O$ is the light intensity incident on the sample. The optical transmission may be determined using an ultraviolet/visible spectrophotometer set at a wavelength of 600 nanometers with a 1 centimeter path length. The optical transmission is a function of the amount of zirconia in a sol. For zirconia-based sols having about 1 weight percent zirconia, the optical transmission is typically at least 70 percent, at least 80 percent, or at least 90 percent. For zirconia-based sols having about 10 weight percent zirconia, the optical transmission is typically at least 20 percent, at least 50 percent, or at least 70 percent.

In many applications, at least a portion of the aqueous-based medium is removed from the zirconia-based sol. Any known means for removing the aqueous-based medium can be used. This aqueous-based medium contains water and often contains dissolved carboxylic acids and/or anions thereof that are present in the feedstock or that are byproducts of the reactions that occur within the hydrothermal reactor. As used herein, the term "carboxylic acids and/or anions thereof" refers to carboxylic acids, carboxylate anions of these carboxylic acids, or mixtures thereof. The removal of at least a portion of these dissolved carboxylic acids and/or anions thereof from the zirconia-based sol may be desirable in some applications. The zirconia-based sol can be subjected to one or more methods such as vaporization, drying, ion exchange, solvent exchange, diafiltration, and dialysis.

In some embodiments, the effluent of the hydrothermal reactor is concentrated or dried with a drying process. Along with removing at least a portion of the water present in the effluent, the concentration or drying process often results in the vaporization of at least a portion of the dissolved carboxylic acids. Any suitable drying method can be used such as spray drying, gap drying, or oven drying. For example, the effluent can be dried in a conventional oven at a temperature of at least 80° C., at least 90° C., at least 100° C., at least 110° C., or at least 120° C. The drying time is often greater than 1 hour, greater than 2 hours, or greater than 3 hours.

In other embodiments, the effluent of the hydrothermal treatment can be subjected to dialysis or diafiltration. Dialysis and diafiltration both tend to remove at least a portion of the dissolved carboxylic acids and/or anions thereof. For dialysis, a sample of the effluent can be positioned within a membrane bag that is closed and then placed within a water bath. The carboxylic acid and/or carboxylate anions diffuse out of the sample within the membrane bag. That is, these species will diffuse out of the effluent through the membrane bag into the water bath to equalize the concentration within the membrane bag to the concentration in the water bath. The water in the bath is typically replaced several times to lower the concentration of species within the bag. A membrane bag is typically selected that allows diffusion of the carboxylic acids and/or anions thereof but does not allow diffusion of the zirconia-based particles out of the membrane bag.

For diafiltration, a permeable membrane is used to filter the sample. The zirconia particles can be retained by the filter if the pore size of the filter is appropriately chosen. The dissolved carboxylic acids and/or anions thereof pass through the filter. Any liquid that passes through the filter is replaced with fresh water. In a discontinuous diafiltration process, the sample is often diluted to a pre-determined volume and then concentrated back to the original volume by ultrafiltration. The dilution and concentration steps are repeated one or more times until the carboxylic acid and/or anions thereof are removed or lowered to an acceptable concentration level. In a continuous diafiltration process, which is often referred to as a constant volume diafiltration process, fresh water is added at the same rate that liquid is removed through filtration. The dissolved carboxylic acid and/or anions thereof are in the liquid that is removed.

A composite material can be formed that includes the zirconia-based particles dispersed and/or suspended (i.e., dispersed, suspended, or a combination thereof) in an organic matrix. In some applications, the zirconia-based particles can be dispersed and/or suspended in the organic matrix without any further surface modification. The organic matrix can be added directly to the effluent from the continuous hydrothermal reactor. Alternatively, the organic matrix can be added to the effluent after treatment to remove at least some of the water, after treatment to remove at least some of the carboxylic acids and/or anions thereof, or after both treatments. The organic matrix that is added is often a polymerizable composition that is subsequently polymerized and/or crosslinked to form a polymeric material.

In some examples, the effluent of the continuous hydrothermal reactor can be subjected to a solvent exchange process. An organic solvent having a higher boiling point than water can be added to the effluent. Examples of organic solvents that are suitable for use in a solvent exchange method include, but are not limited to, 1-methoxy-2-propanol and N-methylpyrrolidone. The water then can be removed by a method such as, for example, distillation, rotary evaporation, oven drying, or the like. Depending on the conditions used for removing the water, at least a portion of the dissolved carboxylic acid and/or anion thereof can also be removed. Other organic matrix material can be added to the treated effluent (i.e., other organic matrix material can be added to the zirconia-based particle suspended in the organic solvent used in the solvent exchange process).

To prepare some composite materials, the zirconia-based particles are further treated with a surface modification agent to improve compatibility with the organic matrix material. Surface modification agents may be represented by the formula A-B where the A group is capable of attaching to the surface of a zirconia-based particle and B is a compatibility group. Group A can be attached to the surface by adsorption, formation of an ionic bond, formation of a covalent bond, or a combination thereof. Group B can be reactive or non-reactive and often tends to impart characteristics to the zirconia-based particles that are compatible (i.e., miscible) with an organic solvent, with another organic matrix material (e.g., monomer, oligomers, or polymeric material), or both. For example, if the solvent is non-polar, group B is typically selected to be non-polar as well. Suitable B groups include linear or branched hydrocarbons that are aromatic, aliphatic, or both aromatic and aliphatic. The surface modifying agents include, but are not limited to, carboxylic acids and/or anions thereof, sulfonic acids and/or anions thereof, phosphoric acids and/or anions thereof, phosphonic acids and/or anions thereof, silanes, amines, and alcohols. Suitable surface modification agents are further described in PCT Application Publication WO 2009/085926 (Kolb et al.), which is incorporated herein by reference.

Any known method of adding the surface modification agent to the zirconia-based particles can be used. The surface modification agent can be added before or after any removal of at least a portion of the carboxylic acids and/or anions thereof from the zirconia-based sol. The surface modification agent can be added before or after removal of the water from the zirconia-based sol. The organic matrix can be added after surface modification or simultaneously with surface modification. Various methods of adding the surface modification agent are further described in WO 2009/085926 (Kolb et al.), which is incorporated herein by reference.

The surface modification reactions can occur at room temperature (e.g., 20° C. to 25° C.) or at an elevated temperature (e.g., up to about 95° C.). When the surface modification agents are acids such as carboxylic acids, the zirconia-based particles typically can be surface-modified at room temperature. When the surface modification agents are silanes, the zirconia-based particles are typically surface modified at elevated temperatures.

The organic matrix typically includes a polymeric material or a precursor to a polymeric material such as a monomer or an oligomer having a polymerizable group. Any suitable technique can be used to combine the zirconia-based particles with the organic matrix. For example, if the organic matrix is a precursor to a polymeric material, the zirconia-based particles can be added prior to the polymerization reaction. If the polymeric material is a thermoplastic, the polymeric material and the zirconia-based particles can be combined using a process such as extrusion, milling, or Brabender mixing. The composite material containing a precursor of a polymeric material is often shaped or coated before polymerization.

Representative examples of monomers include, but are not limited to, (meth)acrylate-based monomers, styrene-based monomers, epoxy-based monomers, and the like. Representative examples of reactive oligomers include, but are not limited to, polyesters having (meth)acrylate groups, polyurethanes having (meth)acrylate groups, or acrylics. Representative examples of polymeric material include, but are not limited to, polyolefins, polyesters, polyurethanes, poly(meth)acrylates, polystyrenes, polycarbonates, and polyimides.

In other applications, the zirconia-based particles are used to form a sintered body. In the process of preparing the sintered body, a zirconia-based green body is formed from the zirconia-based sol. As used herein, the term "green body" refers to an article prepared from the zirconia-based sol by removal of at least some of the liquid phase. That is, the zirconia-based sol is concentrated to form the green body. The green body typically has at least 25 volume percent inorganic oxide. In addition to inorganic oxide, the green body can include a liquid phase, voids, unreacted salts that were in the feedstock, byproducts of the hydrothermal conversion reaction, and the like. Any suitable concentration method can be used to form the green body. Although the zirconia-based sol may be subjected to a drying step in the process of forming the green body, the zirconia-based particles within the green body are typically not sintered. Any drying temperature used to form the green body is typically less than 400° C., less than 300° C., less than 200° C., or less than 100° C.

The green body typically has at least 25 volume percent, at least 30 volume percent, at least 35 volume percent, at least 40 volume percent, or at least 45 volume percent inorganic oxide. The volume percent inorganic oxide can be up to 50 volume percent or even higher. For example, the green body can be in a range of 25 to 50 volume percent, in the range of 25 to 45 volume percent, 25 to 40 volume percent solids, or 25 to 35 volume percent inorganic oxide. The concentration methods used to form the green body typically results in the drawing together of the zirconia-based particles through capillary forces during concentration. The individual zirconia-based particles are typically held together by van der Waals forces or by an organic material such as an organic binder.

In one exemplary concentration method to form the green body, the zirconia-based sol can be subjected to osmotic casting. A sample of the zirconia-based sol can be positioned within a membrane bag that is closed and then placed within a bath of a solution of a poly(alkylene oxide) such as poly(ethylene glycol). The aqueous medium diffuses out of the zirconia-based sol within the membrane bag. That is, the aqueous medium diffuses out of the zirconia-based sol through the membrane bag and into the bath to equalize the concentration of water or water-soluble components within the membrane bag to that in the bath. The bath can be replaced periodically to further lower the concentration of the aqueous medium within the membrane bag. A membrane bag is typically selected that allows diffusion of water, carboxylic acids and/or anions thereof but that does not allow diffusion of the zirconia-based particles out of the membrane bag and that does not allow diffusion of the bath (e.g., poly(alkylene oxide) solution) into the membrane bag. Upon removal of at least a portion of the aqueous medium, the zirconia-based sol tends to become a gel. This gel can then be dried in an oven, such as in an oven set at a temperature in the range of 40° C. to 150° C., in the range of 40° C. to 120° C., in the range of 40° C. to 100° C., or in the range of 40° C. to 80° C. to from the green body. The green body has at least 25 volume percent, at least 30 volume percent, or at least 35 volume percent inorganic oxide.

In another exemplary method, the zirconia-based sol can be subjected to distillation or to both distillation and drying for concentration purposes. For example, the zirconia-based sol can be concentrated to about 10 to 15 volume percent inorganic oxide using distillation methods and then further concentrated to at least 25 volume percent inorganic oxide based on the total volume of the resulting green body. The carboxylic acid and/or carboxylate anions optionally can be removed from the zirconia-based sol prior to concentration using any of the techniques discussed above.

The zirconia-based particles within the green body are sintered to form the sintered body. The green body is typically heated at a controlled rate to the desired sintering temperature and then held at the sintering temperature for a time sufficient for sintering to occur. For example, the temperature can be increased at a rate 1° C./minute to 200° C./minute, at a rate of 5° C./minute to 100° C./minute, at a rate of 10° C./minute to 100° C./minute, or at a rate of 10° C./minute to 50° C./minute. The sintering temperature can be held for any suitable amount of time such as at least 1 minute, at least 5 minutes, at least 10 minutes, at least 30 minutes, at least 60 minutes, at least 2 hours, at least 3 hours, or at least 4 hours. The sintered body is then cooled to room temperature. The rate of cooling is often controlled.

Any desired sintering temperature can be selected to form the sintered body. If the sintering temperature is too low, however, sintering may not be complete and residual pores can remain. These residual pores may weaken the sintered body and may also negatively impact translucency. If the sintering temperature is too high, however, the grain size tends to increase. An increased grain size may also negatively impact translucency. In many embodiments the sintering temperature can be in the range of 1000° C. to 1250° C. The sintering process is typically done in air.

Depending on the final use of the sintered body, the green body can optionally be pulverized or broken up into a desired granule size prior to sintering In some applications, it may be desirable to form a partially sintered body. As used herein, the term "partially sintered body" refers to a material that is intermediate between the green body and the sintered body. The partially sintered body typically contains no more than 75 volume percent inorganic oxide and at least 25 volume percent voids. The partially sintered body can have more mechanical integrity than the green body. For example, some green bodies tend to crumble apart when handled and cannot be machined to another shape. The partially sintered body, however, can be machined and typically does not crumble when handled. Because it has a lower density, the partially sintered body can be more readily machined than a sintered body to a desired shape.

The partially sintered body usually includes 25 to 75 volume percent inorganic oxide based on a total volume of the partially sintered body. For example, the partially sintered body can have at least 25 volume percent, at least 30 volume percent, at least 35 volume percent, at least 40 volume percent, or at least 45 volume percent inorganic oxide. The partially sintered body can have up to 75 volume percent, up to 70 volume percent, up to 65 volume percent, or up to 60 volume percent inorganic oxide. In some embodiments, the partially sintered body can include 30 to 75 volume percent, 35 to 75 volume percent, 40 to 75 volume percent, 30 to 70 volume percent, 30 to 60 volume percent, 40 to 70 volume percent, or 40 to 60 volume percent inorganic oxide. The inorganic oxide contains at least 92.5 mole percent zirconium oxide, at least 1.5 mole percent yttrium oxide, and at least 0.5 mole percent lanthanum oxide.

In addition to the inorganic oxide, the partially sintered body typically includes voids. For example, the partially sintered body can include 25 to 75 volume percent voids based on the total volume of the partially sintered body. Often, all or most of the volume of the partially sintered body that is not attributable to the inorganic solids is attributable to voids. Usually, all or almost all (e.g., at least 90 percent or more, at least 95 percent or more, at least 98 percent or more, or at least 99 percent or more) of the liquid phase that was present in the zirconia-based sol has been removed in the formation of the partially sintered body. Likewise, all or almost all of any carboxylic acid byproduct of the hydrothermal treatment has been removed in the formation of the partially sintered body.

In some embodiments, the partially sintered body can include 25 to 75 volume percent inorganic oxide and 25 to 75 volume percent voids, 30 to 75 volume percent inorganic and 25 to 70 volume percent voids, 40 to 75 volume percent inorganic oxide and 25 to 60 volume percent voids, 30 to 70 volume percent inorganic oxide and 30 to 70 volume percent voids, 30 to 60 volume percent inorganic oxide and 40 to 70 volume percent voids, or 40 to 60 volume percent inorganic oxide and 40 to 60 volume percent voids.

The partially sintered body can be prepared from the green body using a combination of sintering time and temperature to provide 25 to 75 volume percent inorganic oxide and 25 to 75 volume percent voids based on a total volume of the partially sintered body. The partially sintered body typically has been exposed to a temperature equal to at least 400° C. For example, the temperature can be in the range of 400° C. to 1100° C. The time and temperature combination is selected to partially sinter the zirconia-based particles together. The extent of sintering is selected to be sufficient to provide the desired mechanical integrity and density to the partially sintered body. Similarly to the formation of the sintered body, the temperature can be increased to the desired temperature at a controlled rate and can be decreased from the desired temperature at a controlled rate.

The partially sintered body can be further sintered to form the sintered body. The sintered body can be used for many applications where tough ceramic material is desired. For example, the sintered body can be used in various dental applications.

Various items are provided that are zirconia-based particles, sols containing zirconia-based particles, method of making zirconia-based particles, composite materials containing zirconia-based particles, or sintered bodies formed from zirconia-based particles.

A first item includes zirconia-based particles. The zirconia-based particles contain a) 0.02 to 20 mole percent lanthanide element oxide based on a total moles of inorganic oxide in the zirconia-based particles and b) 0 to 15 mole percent yttrium oxide based on the total moles of inorganic oxide in the zirconia-based particles. The zirconia-based particles are crystalline and have an average primary particle size no greater than 100 nanometers.

A second item is provided that can be a version of the first item. In the second item, the average primary particle size is no greater than 50 nanometers.

A third item is provided that can be a version of the first or second items. In the third item, the average primary particle size is no greater than 30 nanometers.

A fourth item is provided that can be a version of any one of the first to third items. In the fourth item, the zirconia-based particles contain 0.1 to 10 mole percent lanthanide element oxide.

A fifth item is provided that can be a version of any one of the first to fourth items. In the firth item, wherein the zirconia-based particles contain 0.1 to 10 mole percent lanthanide element oxide and 1 to 15 mole percent yttrium oxide.

A sixth item is provided that can be a version of any one of the first to fifth items. In the sixth item, the zirconia-based particles contain 0.5 to 5 mole percent lanthanide element oxide and 5 to 15 mole percent yttrium oxide.

A seventh item is provided that can be a version of any one of the first to sixth items. In the seventh item, the zirconia-based particles contain 1 to 7 mole percent lanthanide element oxide and 1 to 7 mole percent yttrium oxide.

An eighth item is provided that can be a version of any one of the first to seventh items. In the eighth item, the zirconia-based particles have a volume-average size determined by Photon Correlation Spectroscopy that is no greater than 70 nanometers and a Z-average particle size determined by Photon Correlation Spectroscopy that is no greater than 50 nanometers.

A ninth item is provided that can be a version of any one of the first to eighth items. In the ninth item, the zirconia-based particles have a crystal structure that is at least 70 percent cubic, tetragonal, or a combination thereof.

A tenth item is provided that is a sol. The sol contains at least 3 weight percent zirconia-based particles dispersed, suspended, or a combination thereof in an aqueous medium. The zirconia-based particles contain a) 0.02 to 20 mole percent lanthanide element oxide based on a total moles of inorganic oxide in the zirconia based particles and b) 0 to 15 mole percent yttrium oxide based on the total moles of inorganic oxide in the zirconia-based particles. The zirconia-based particles are crystalline and have an average primary particle size no greater than 100 nanometers.

An eleventh item is provided that can be a version of the tenth item. In the eleventh item, less than 5 weight percent of the zirconia-based particles in the sol settle when the sol is stored for one week at room temperature.

A twelfth item is provided that can be a version of the tenth or eleventh items. In the twelfth item, the average primary particle size of the zirconia-based particles is no greater than 50 nanometers.

A thirteenth item is provided that can be a version of any one of the tenth to twelfth items. In the thirteenth item, the average primary particle size of the zirconia-based particles is no greater than 30 nanometers.

A fourteenth item is provided that can be a version of any one of the tenth to thirteenth items. In the fourteenth item, the zirconia-based particles have a crystal structure that is at least 70 percent cubic, tetragonal, or a combination thereof.

A fifteenth item is provided that is a method of making zirconia-based particles. The method includes preparing a feedstock comprising multiple salts dissolved, suspended, or a combination thereof in an aqueous-based medium. The multiple salts include a zirconium salt, a lanthanide element salt, and an optional yttrium salt. The method further includes subjecting the feedstock to a hydrothermal treatment to form a sol comprising at least 3 weight percent zirconia-based particles. The zirconia-based particles contain a) 0.02 to 20 mole percent lanthanide element oxide based on total moles of inorganic oxide in the zirconia-based particles and b) 0 to 15 mole percent yttrium oxide based on the total moles of inorganic oxide in the zirconia-based particles. The zirconia-based particles are crystalline and have an average primary particle size no greater than 100 nanometers.

A sixteenth item is provided that can be a version of the fifteenth item. In the sixteenth item, the method further includes subjecting the sol to dialysis, distillation, diafiltration, or a combination thereof to at least partially remove a by-product of the hydrothermal treatment.

A seventeenth item is provided that is a composite material. The composite material contains zirconia-based particles dispersed in an organic matrix. The zirconia-based particles contain a) 0.02 to 20 mole percent lanthanide element oxide based on total moles of inorganic oxide in the zirconia-based particles and b) 0 to 15 mole percent yttrium oxide based on the total moles of inorganic oxide in the zirconia-based particles. The zirconia-based particles are crystalline and have an average primary particle size no greater than 100 nanometers.

An eighteenth item is provided that is a sintered body. The sintered body includes a product formed by sintering zirconia-based particles. The zirconia-based particles contain a) 0.02 to 20 mole percent lanthanide element oxide based on total moles of inorganic oxide in the zirconia-based particles and b) 0 to 15 mole percent yttrium oxide based on the total moles of inorganic oxide in the zirconia-based particles. The zirconia-based particles are crystalline and have an average primary particle size no greater than 100 nanometers.

EXAMPLES

These examples are for illustrative purposes only and are not meant to be limiting on the scope of the appended claims. Sol compositions are reported in mole percent inorganic oxide. All other parts, percentages, and ratios in the examples are by weight unless otherwise noted. Solvents and other reagents used can be obtained from Sigma-Aldrich Chemical Company (Milwaukee, Wis.) unless otherwise noted.

Table of Abbreviations

| Abbreviation or Trade Designation | Description |
|---|---|
| MEEAA | 2-(2-(2-Methoxyethoxy) Ethoxy) Acetic Acid available form Aldrich Chemical Company (Milwaukee, WI) |
| Zirconium acetate | An aqueous solution of zirconium acetate containing nominally 16.3 weight percent Zr that is commercially available from Magnesium Elektron, Inc. (Flemington, NJ). |
| DI water | De-ionized water |
| Yttrium acetate | Yttrium acetate tetrahydrate, which is commercially available from AMR Technologies Inc (Toronto Canada) |
| TBPEA | Tribromophenoxyethylacrylate, which is commercially available from Dai-Chi Kogyo Seiyaku Co., Ltd. (Kyoto, Japan) |
| PEA | Phenoxyethyl acrylate, which is commercially available from Sartomer (Exton, PA) |
| PROSTABB 5198 | A radical inhibitor that is commercially available from Ciba Specialties (Hawthorne, NY) |
| 1-Methoxy-2-propanol | An alcohol that is commercially available from Aldrich Chemical (Milwaukee, WI) |
| Maleic acid | An organic acid that is commercially available from Aldrich Chemical (Milwaukee, WI) |
| TMPTA | Trimethylolpropane triacrylate that is commercially available from Sartomer Company Inc. (Exton PA) |
| Phthalic anhydride | An anhydride that is commercially available from Aldrich Chemical Company (Milwaukee, WI) |
| 2-Hydroxyethyl acrylate | An acrylate monomer that is commercially available from Aldrich Chemical Company (Milwaukee, WI) |
| Triethylamine | A base that is commercially available from Aldrich Chemical Company (Milwaukee, WI) |
| Resin 1 | A mixture containing 50/30/20 weight percent TBPEA/PEA/TMPTA |
| Lanthunum acetate | Lathanum (III) acetate hydrate, which is commercially available from Alfa Aesar (Wardhill, MA) |
| Samarium nitrate | Samarium (III) nitrate hexahydrate, which is commercially available from Aldrich Chemical Company (Milwaukee, WI) |
| Cerium acetate | Cerium (III) acetate hydrate, which is commercially available from Strem Chemical (Newburyport, MA) |
| Europium nitrate | Europium (III) nitrate hydrate, which is commercially available from Alfa Aesar (Wardhill, MA) |
| Erbium nitrate | Erbium (III) nitrate pentahydrate, which is commercially available from Alfa Aesar (Wardhill, MA) |
| Terbium nitrate | Terbium (III) nitrate pentahydrate, which is commercially available from Aldrich Chemical Company (Milwaukee, WI) |
| Thulium nitrate | Thulium (III) nitrate pentahydrate, which is commercially available from Aldrich Chemical Company (Milwaukee, WI) |
| Neodymium nitrate | Neodymium (III) nitrate hexahydrate, which is commercially available from Aldrich Chemical Company (Milwaukee, WI) |
| Ytterbium nitrate | Ytterbium (III) nitrate, which is commercially available from Aldrich Chemical Company (Milwaukee, WI) |

Crystalline Structure and Size (XRD Analysis)

Dried zirconia-based samples were ground by hand using an agate mortar and pestle. A liberal amount of the sample was applied by spatula to a glass microscope slide on which a section of double coated tape had been adhered. The sample was pressed into the adhesive on the tape by forcing the sample against the tape with the spatula blade. Excess sample was removed by scraping the sample area with the edge of the spatula blade, leaving a thin layer of particles adhered to the adhesive. Loosely adhered materials remaining after the scraping were removed by forcefully tapping the microscope slide against a hard surface. In a similar manner, corundum (Linde 1.0 µm alumina polishing powder, Lot Number C062, Union Carbide, Indianapolis, Ind.) was prepared and used to calibrate the X-ray diffractometer for instrumental broadening.

X-ray diffraction scans were obtained using a Philips vertical diffractometer having a reflection geometry, copper $K_\alpha$ radiation, and a proportional detector registry of the scattered radiation. The diffractometer was fitted with variable incident beam slits, fixed diffracted beam slits, and a graphite diffracted beam monochromator. The survey scan was recorded from 50 to 80 degrees two theta (2θ) using a 0.04 degree step size and 4 second dwell time. X-ray generator settings of 45 kV and 35 mA were used. Data collections for the corundum standard were conducted on three separate areas of several individual corundum mounts. Data was collected on three separate areas of the thin layer sample mount.

The observed diffraction peaks were identified by comparison to the reference diffraction patterns contained within the International Center for Diffraction Data (ICDD) powder diffraction database (sets 1-47, ICDD, Newton Square, Pa.) and attributed to either cubic/tetragonal (C/T) or monoclinic (M) forms of zirconia. The (111) peak for the cubic phase and (101) peak for the tetragonal phase could not be separated so these phases were reported together. The amount of each zirconia phase was evaluated on a relative basis and the phase of zirconia having the most intense diffraction peak was assigned the relative intensity value of 100. The strongest line of the remaining crystalline zirconia phase was scaled relative to the most intense line and given a value between 1 and 100.

Peak widths for the observed diffraction maxima due to corundum were measured by profile fitting. The relationship between mean corundum peak widths and corundum peak position (2θ) was determined by fitting a polynomial to these data to produce a continuous function used to evaluate the instrumental breadth at any peak position within the corundum testing range. Peak widths for the observed diffraction maxima due to zirconia were measured by profile fitting the observed diffraction peaks. The following peak widths were evaluated depending on the zirconia phase found to be present:

Cubic/Tetragonal (C/T): (1 1 1)

Monoclinic (M): (−1 1 1), and (1 1 1)

A Pearson VII peak shape model with $K_{\alpha 1}$ and $K_{\alpha 2}$ wavelength components and linear background model were employed in all cases. Widths were found as the peak full width at half maximum (FWHM) having units of degrees. The profile fitting was accomplished by use of the capabilities of the JADE diffraction software suite.

Sample peaks were corrected for instrumental broadening by interpolation of instrumental breadth values from corundum instrument calibration and corrected peak widths converted to units of radians. The Scherrer equation was used to calculate the primary crystal size.

$$\text{Crystallite Size}(D) = K\lambda/\beta(\cos\theta)$$

In the Scherrer equation, K is the form factor (here 0.9), λ is the wavelength (1.540598 Å), β is the calculated peak width after correction for instrumental broadening (in radians), and θ equals half the peak position (scattering angle). β is equal to [calculated peak FWHM−instrumental breadth] (converted to radians) where FWHM is full width at half maximum.

The cubic/tetragonal (C/T) mean crystallite size was measured as the average of three measurements using (1 1 1) peak. That is, $$C/T \text{ mean crystallite size} = [D(1\ 1\ 1)_{area\ 1} + D(1\ 1\ 1)_{area\ 2} + D(1\ 1\ 1)_{area\ 3}]/3.$$

The monoclinic (M) crystallite size was measured as the average of three measurements using the (−1 1 1) peak and three measurements using the (1 1 1) peak.

$$M \text{ mean crystallite size} = [D(-1\ 1\ 1)_{area\ 1} + D(-1\ 1\ 1)_{area\ 2} + D(-1\ 1\ 1)_{area\ 3} + D(1\ 1\ 1)_{area\ 1} + D(1\ 1\ 1)_{area\ 2} + D(1\ 1\ 1)_{area\ 3}]/6$$

The weighted average of the cubic/tetragonal (C/T) and monoclininc phases (M) were calculated.

$$\text{Weighted average} = [(\%\ C/T)(C/T\ \text{size}) + (\%\ M)(M\ \text{size})]/100$$

In this equation, % C/T equals the percent crystallinity contributed by the cubic and tetragonal crystallite content of the zirconia-based particles taken from diffracted peak areas; C/T size equals the size of the cubic and tetragonal crystallites; % M equals the percent crystallinity contributed by the monoclinic crystallite content of the zirconia-based particles; and M size equals the size of the monoclinic crystallites.

Weight Percent Solids

The weight percent solids were determined by drying a sample weighing 3 to 6 grams at 120° C. for 30 minutes. The percent solids can be calculated from the weight of the wet sample (i.e., weight before drying, $\text{weight}_{wet}$) and the weight of the dry sample (i.e., weight after drying, $\text{weight}_{dry}$) using the following equation.

$$\text{Wt-\% solids} = 100(\text{weight}_{dry})/\text{weight}_{wet}$$

Fluorescent Signal Measurements

The zirconia-based sols were dried in a convection oven at 120° C. for 30 minutes. The resultant powder was placed on a glass microscope slide. The slide was placed in a Chromato-Vue cabinet (Model cc-10 available from UVP Inc., Upland Calif.). The sample was irradiated with light having a wavelength of 254 nanometers using a handheld ultraviolet lamp (model UVGL-58 available from UVP Inc., Upland Calif.). The fluorescence signal intensity was compared to the fluorescent signal for a zirconia-based control that was not doped with a lanthanide element.

Inductively Coupled Plasma Atomic Emission Spectroscopy (ICP)

Inductively Coupled Plasma Atomic Emission Spectroscopy was used to analyze the zirconia-based sol samples for the lanthanide element concentration. Liquid samples were aspirated into an argon plasma where desolvation, dissociation, atomization, and excitation occur. Each element has a well established and characteristic wavelengths associated with emission from an excited state. The intensity of the emission is typically proportional to the concentration of the element. The concentration of the element can be calculated by comparing the intensity of the emission with that of standards of known concentration.

The zirconia-based sols (0.2 to 0.3 grams) were accurately weighed into a centrifuge tube. Deionized water (40 mL) and hydrochloric acid (2 mL of EMD OMNITRACE concentrated hydrochloric acid (37-38 percent)) was added. The solutions were then diluted to a total of 50 mL with deionized water. Duplicates of each sample were prepared. Two blanks containing just the hydrochloric acid and water were also prepared. The samples and blanks were analyzed on an ICP optical emission spectrometer (Perkin Elmer Optima 4300 available from Perkin Elmer, Shelton, Conn.). The instrument was calibrated using a multi-element standard containing at least the lanthanide element. The standards, which were obtained from solutions that are available from High Purity Standards, Charleston, S.C., had concentrations of 0.2 ppm, 0.5 ppm, and 1.5 ppm (microgram per milliliter). The results were normalized to the amount of zirconia in the starting zirconia-based sol.

Photon Correlation Spectroscopy (PCS)

Particle size measurements were made using a Zeta Sizer-nano Series, Model ZEN3600 instrument equipped with a red laser having a 633 nanometer wavelength of light. This instrument is commercially available from Malvern Instruments Inc. (Westborough, Mass.). Each sample was analyzed in a one centimeter square polystyrene sample cuvette. The sample cuvette was filled with approximately 1 gram of deionized water and then a few drops (approximately 0.1 grams) of the zirconia-based sol was added. The composition (e.g., sample) within each sample cuvette was mixed by drawing the composition into a clean pipet and discharging the composition back into the sample cuvette several times. The sample cuvette was then placed in the instrument and equilibrated at 25° C. The instrument parameters were set as follows: dispersant refractive index 1.330, dispersant viscosity 1.0019 mPa-second, material refractive index 2.10, and material absorption value 0.10 units. The automatic size-measurement procedure was then run. The instrument automatically adjusted the laser-beam position and attenuator setting to obtain the best measurement of particle size.

The ZEN3600 instrument illuminated the sample with a laser and analyzed the intensity fluctuations of the light scattered from the particles at an angle of 173 degrees. The method of Photon Correlation Spectroscopy (PCS) was used by the instrument to calculate the particle size. PCS uses the fluctuating light intensity to measure Brownian motion of the particles in the liquid. The particle size is then calculated to be the diameter of sphere that moves at the measured speed.

The intensity of the light scattered by the particle is proportional to the sixth power of the particle diameter. The Z-average size or cumulant mean is a mean calculated from the intensity distribution and the calculation is based on assumptions that the particles are mono-modal, mono-disperse, and spherical. Related functions calculated from the fluctuating light intensity are the Intensity Distribution and its mean. The mean of the Intensity Distribution is calculated based on the assumption that the particles are spherical. Both the Z-average size and the Intensity Distribution mean are more sensitive to larger particles than smaller ones. The calculations for the Z-average size are defined in the ISO standard document 13321:1996 E.

The Volume Distribution gives the percentage of the total volume of particles corresponding to particles in a given size range. The volume-average size is the size of a particle that corresponds to the mean of the Volume Distribution. Since the volume of a particle is proportional to the third power of the diameter, this distribution is less sensitive to larger particles than the Z-average size. Thus, the volume-average will typically be a smaller value than the Z-average size.

Hydrothermal Reactor A

This reactor was prepared from 50 feet (15 meters) of Stainless Steel Braided Smooth Tube Hose (DuPont T62 Chemfluor PTFE, 0.25 inch I.D., 0.065 inch thick wall available from Saint-Gobain Performance Plastics, Beaverton, Mich.). This tube was immersed in a bath of peanut oil heated to the desired temperature. Following the reactor tube, a coil of an additional 10 feet (3 meters) of Stainless Steel Braided Smooth Tube Hose (DuPont T62 Chemfluor PTFE, 0.25 inch inner diameter, 0.065 inch thick wall plus 10 feet (3 meters) of 0.25 inch stainless-steel tubing with a diameter of 0.25 inch (0.64 cm) and wall thickness of 0.035 inch (0.089 cm) that was immersed in an ice-water bath to cool the material and a backpressure regulator valve was used to maintain an exit pressure of 400 psi (pounds per square inch).

Hydrothermal Reactor B

This reactor was prepared from 50 feet (15 meters) of Stainless Steel Braided Smooth Bore Tube Hose (Coreflex B-Cor PTFE, 0.125 inch inner diameter, 0.0625 inch thick wall available from Corflex LLC (Bowie, Md.). This tube was immersed in a bath of peanut oil heated to the desired temperature. Following the reactor tube, a coil of an additional 10 feet (3 meters) of the same 0.125 inch tubing was immersed in an ice-water bath to cool the material. A backpressure regulator valve was used to maintain an exit pressure of 400 psi.

Preparative Example 1: Preparation of phthalic acid mono-(2-acryloyloxy-ethyl) ester (HEAP)

Phthalic anhydride (112.1 grams), 2-hydroxyethyl acrylate (87.9 grams) and triethylamine (0.44 grams) were mixed in a round bottom flask. A small amount of dry air was bubbled into the liquid. The reaction mixture was mixed and heated to 75° C. and held at that temperature for six hours. The product was cooled to room temperature. NMR (Nuclear Magnetic Resonance) was used to confirm that the product was phthalic acid mono-(2-acryloyloxy-ethyl)ester. The product partially crystallized over time. The product was mixed with 1-methoxy-2-propanol to prepare a 50 weight percent solution.

Comparative Example (CE) 1: Preparation of $ZrO_2/Y_2O_3$ (97.78/2.22)

A precursor solution was prepared by combining zirconium acetate (10 grams), yttrium acetate (0.269 grams) and DI water (9.48 g) with stirring. The resulting solution (19 weight percent solids) was placed into a general purpose acid digestion bomb with a Teflon cup (Parr Model number 4749). The acid digestion bomb was placed in a forced air oven at a temperature of 225° C. for 4 hours. A slightly cloudy and stable zirconia-based sol was obtained.

The size of the particles within the sol was measured by PCS. The Z-average size was 30.52 nanometers and the volume-average size was 21.11 nanometers.

The resultant sol contained crystalline $ZrO_2$ and the X-ray diffraction data are summarized in Table 1.

Example (Ex) 1: $ZrO_2/Y_2O_3/La_2O_3$ (96.8/2.2/0.99)

A precursor solution was prepared by combining zirconium acetate (2,100 grams), yttrium acetate (60.25 grams), lanthanum acetate (27.09 grams), and DI water (2097 grams) with stirring. The resulting solution (19 weight percent solids) was pumped at a rate of 2.87 milliliters/minute (mL/min) through Hydrothermal Reactor B. The temperature was 207° C. and the average residence time was 42 minutes. A slightly cloudy and stable zirconia-based sol was obtained.

The resultant sol contained particles of crystalline $ZrO_2$ and the x-ray diffraction data is summarized in Table 1. Incorporation of yttrium and lanthanum into the particles is confirmed by the absence of peaks due to yttria (yttrium oxide) and lanthana (lanthanum oxide). The lattice parameter of 5.14 Angstroms also suggests incorporation of yttrium and/or lanthanum into the zirconia lattice.

The average particle size of the particles within the sol was measured by PCS. The Z-average particle size was 21.6 nanometers and the volume-average particles size was 14.86 nanometers.

A portion of the sol was dialyzed for 24 to 48 hours with a large excess of water (Spectra/Por Dialysis membrane MWCO 12-14,000 available from Spectrum Laboratories, Inc (Rancho Dominguez Calif.)). Based on ICP analysis of the sols before and after dialysis, 65.04 mole percent of the lanthanum was retained.

Example 2a: $ZrO_2/Y_2O_3/La_2O_3$ (95.7/2.3/2.0)

A precursor solution was prepared by combining zirconium acetate (800 grams), yttrium acetate (23.14 grams), lanthanum acetate (20.82 grams), and DI water (852 g) with stirring. The resulting solution (19 weight percent solids) was pumped at a rate of 2.87 mL/min through Hydrothermal Reactor B. The temperature was 207° C. and the average residence time was 42 minutes. A slightly cloudy and stable zirconia-based sol was obtained.

The average particle size of the particles within the sol was measured by PCS. The Z-average particle size was 28.45 nanometers and the volume-average particles size was 20.7 nanometers.

Figure 2:
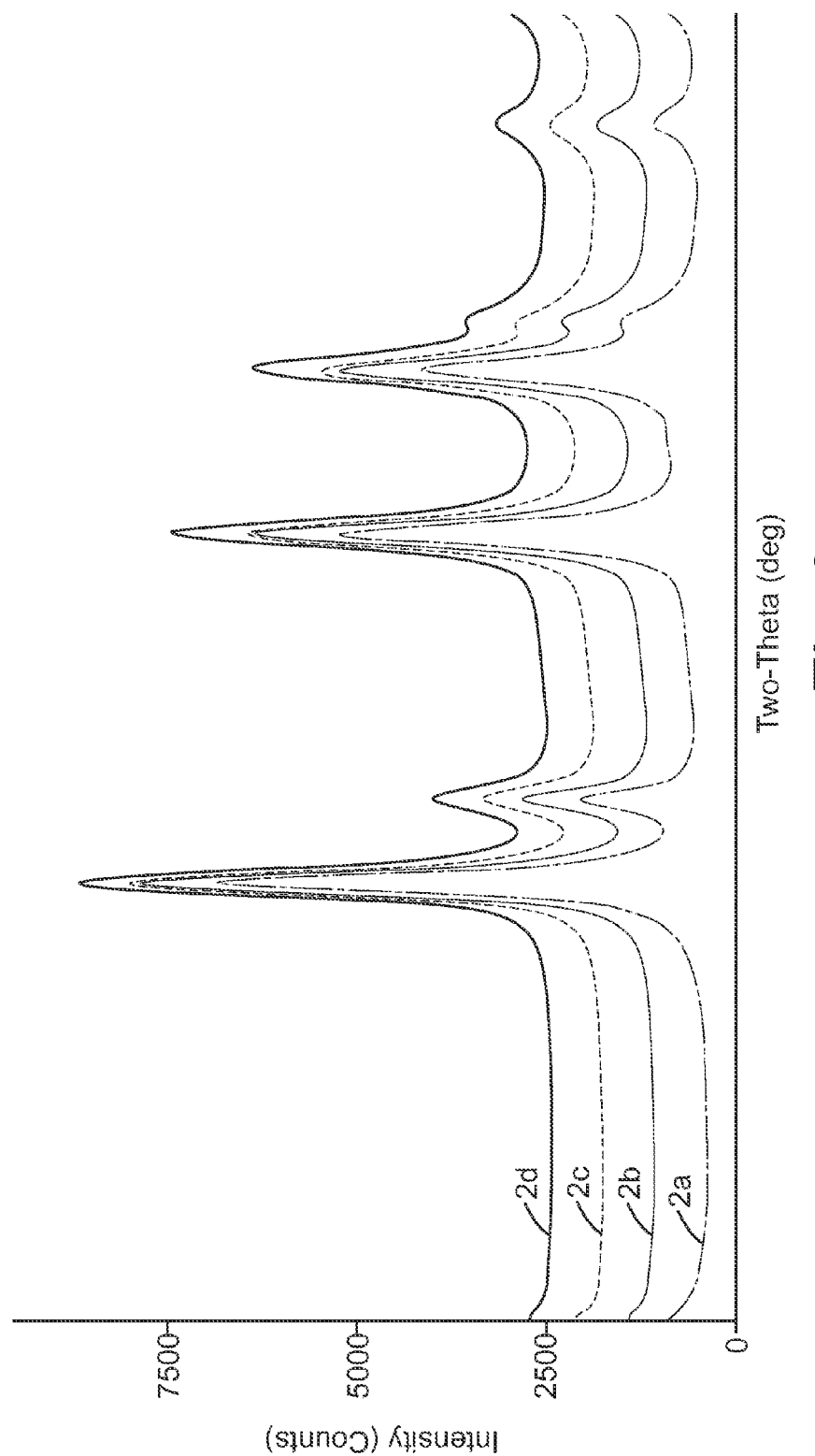
FIG. 2 shows four x-ray diffraction scans for exemplary zirconia-based particles.

The resultant sol contained crystalline $ZrO_2$ and the x-ray diffraction data is summarized in Table 2. The x-ray diffraction scan corresponds to scan A in FIG. 2. A separate yttria or lanthana phase was not detected using x-ray diffraction. The lattice parameters also suggest incorporation of yttria and/or lanthana into the structure.

A portion of the sample was dialyzed for 24 to 48 hours with a large excess of water (Spectra/Por Dialysis membrane MWCO 12-14,000 available from Spectrum Laboratories, Inc (Rancho Dominguez Calif.)). Based on ICP analysis of the sols before and after dialysis, 66.19 mole percent of the lanthanum was retained.

Example 2b: $ZrO_2/Y_2O_3/La_2O_3$ (95.7/2.3/2.0)

A precursor solution was prepared by combining zirconium acetate (800 grams), yttrium acetate (23.14 grams), lanthanum acetate (20.82 grams), and DI water (852 grams) with stirring. The resulting solution (19 weight solids) was pumped at a rate of 2.87 mL/min through Hydrothermal Reactor B. The temperature was 225° C. and the average residence time was 42 minutes. A clear and stable zirconia-based sol was obtained.

The average particle size of the particles within the sol was measured by PCS. The Z-average particle size was 20.56 nanometers and the volume-average particle size was 14.06 nanometers.

The resultant sol contained crystalline $ZrO_2$ and the x-ray diffraction data is summarized in Table 2. The x-ray diffraction scan corresponds to scan B in FIG. 2. A separate yttria or lanthana phase was not detected using x-ray diffraction. The lattice parameters also suggest incorporation of yttria and/or lanthana into the structure.

A portion of the sol was dialyzed for 24 to 48 hours with a large excess of water (Spectra/Por Dialysis membrane MWCO 12-14,000 available from Spectrum Laboratories, Inc (Rancho Dominguez Calif.)). Based on ICP analysis of the sols before and after dialysis, 68.23 mole percent of the lanthanum was retained.

Example 2c: $ZrO_2/Y_2O_3/La_2O_3$ (94.7/2.3/3)

A precursor solution was prepared by combining zirconium acetate (800 grams), yttrium acetate (23.42 grams),

TABLE 1

X-ray Diffraction Data for Comparative Example 1 and Example 1

| Example | M Intensity | M size (nm) | C/T intensity | C/T size (nm) | % C/T | XRD Average Size (nm) | Lattice Parameter (A) |
|---|---|---|---|---|---|---|---|
| CEx 1 Initial sol | 21 | 4.3 | 100 | 9.4 | 61 | 7.4 | 5.09 |
| Ex 1 | 5 | 5.4 | 100 | 8.2 | 85 | 7.5 | 5.14 | lanthanum acetate (31.78 grams), and DI water (900 grams) with stirring. The resulting solution (19 weight percent solids) was pumped at a rate of 2.87 mL/min through Hydrothermal Reactor B. The temperature was 225° C. and the average residence time was 42 minutes. A clear and stable zirconia-based sol was obtained.

The average particle size of the particles within the sol was measured by PCS. The Z-average particle size was 22.79 nanometers and the volume-average particle size was 15.6 nanometers.

The resultant sol contained crystalline $ZrO_2$ and the x-ray diffraction data is summarized in Table 2. The x-ray diffraction scan corresponds to scan C in FIG. 2. A separate yttria or lanthana phase was not detected using x-ray diffraction. The lattice parameters also suggest incorporation of yttria and/or lanthana into the structure. A portion of the sample was dialyzed for 24 to 48 hours with a large excess of water (Spectra/Por Dialysis membrane MWCO 12-14,000 available from Spectrum Laboratories, Inc (Rancho Dominguez Calif.)). Based on ICP analysis of the sols before and after dialysis, 66.75 mole percent of the lanthanum was retained.

Example 2d: $ZrO_2/Y_2O_3/La_2O_3$ (95.7/2.3/2.0)

A precursor solution was prepared by combining zirconium acetate (800 grams), yttrium acetate (23.14 grams), lanthanum acetate (20.82 grams), and DI water (852 grams) with stirring. The resulting solution (19 weight percent solids) was pumped at a rate of 2.87 mL/min through Hydrothermal Reactor B. The temperature was 250° C. and the average residence time was 42 minutes. A slightly cloudy and stable zirconia sol was obtained.

The particle size of the particles within the sol was measured by PCS. The Z-average particle size was 42.53 nanometers and the volume-average particle size was 30.87 nanometers.

The resultant sol contained crystalline $ZrO_2$ and the x-ray diffraction data is summarized in Table 2. The x-ray diffraction scan corresponds to scan D in FIG. 2. A separate yttria or lanthana phase was not detected using x-ray diffraction. The lattice parameters also suggest incorporation of yttria and/or lanthana into the structure.

A portion of the sample was dialyzed for 24 to 48 hours with a large excess of water (Spectra/Por Dialysis membrane MWCO 12-14,000 available from Spectrum Laboratories, Inc (Rancho Dominguez Calif.)). Based on ICP analysis of the sols before and after dialysis, 66.58 mole percent of the lanthanum was retained.

TABLE 2

X-ray Diffraction Data for Examples 2a-2d

| Example | M Intensity | M size (nm) | C/T intensity | C/T size (nm) | % C/T | XRD Average Size (nm) | Lattice Parameter |
|---|---|---|---|---|---|---|---|
| 2a | 6 | 7.1 | 100 | 7.6 | 90 | 7.3 | 5.15 |
| 2b | 2 | 5.9 | 100 | 6.6 | 94 | 6.5 | 5.15 |
| 2c | <1 | 7.5 | 100 | 6.1 | 95 | 6.2 | 5.15 |
| 2d | ND | * * * | 100 | 5.5 | 100 | 5.5 | 5.14 |

Comparison of Examples 2a, 2b and 2d show the effect of reaction temperature on the structure.

Example 3: $ZrO_2/Y_2O_3/La_2O_3$ (95.7/2.3/2.0)

A precursor solution was prepared by combining zirconium acetate (2000 grams), yttrium acetate (57.6 grams), lanthanum acetate (53.1 grams), and DI water (2166 grams) with stirring. The resulting solution (19 weight percent solids) was pumped at a rate of 11.48 mL/min through Hydrothermal Reactor A. The temperature was 225° C. and the average residence time was 42 minutes. A clear and stable zirconia sol was obtained.

The particle size of the particles within the sol was measured by PCS. The Z-average particle size was 34.93 nanometers and the volume-average particle size was 22.2 nanometers.

The resultant sol contained crystalline $ZrO_2$ and the x-ray diffraction data is summarized in Table 3. A separate yttria or lanthana phase was not detected using x-ray diffraction. The lattice parameter of 5.11 further suggests incorporation of yttrium and/or lanthanum into the zirconia lattice.

TABLE 3

X-ray diffraction for Example 3

| Example | M Intensity | M size (nm) | C/T intensity | C/T size (nm) | % C/T | XRD Average Size (nm) | Lattice Parameter (A) |
|---|---|---|---|---|---|---|---|
| Ex 3 Initial sol | 3 | ~15 | 100 | 6.4 | 84 | 7.8 | 5.11 |

Example 4: $ZrO_2/Y_2O_3/Er_2O_3$ (96.81/2.2/0.99)

A precursor solution was prepared by combining zirconium acetate (50 grams), yttrium acetate (1.34 grams), erbium nitrate (0.765 grams), and DI water (50.1 grams) with stirring. The resulting solution (19 weight percent solids) was placed into a general purpose acid digestion bomb with Teflon cup (Parr Model number 4749). The acid digestion bomb was placed in a forced air oven at a temperature of 225° C. for 4 hours. A slightly cloudy and stable zirconia sol was obtained. The sol had a pink color.

The particle size of the sol was measured by PCS. The Z-average particle size was 44.26 nanometers. The volume-average particles size was bimodal with one peak at 11.59 nanometers (36.5 volume percent) and 30.98 nanometers (63.6 volume percent).

The resultant sol contained crystalline $ZrO_2$ and the x-ray diffraction data is summarized in Table 4. Incorporation of yttrium and erbium into the zirconia lattice is confirmed by the absence of peaks due to yttria and erbia. The lattice parameter of 5.11 further suggests incorporation of yttrium and/or erbium into the zirconia lattice.

TABLE 4

X-ray Diffraction Data for Example 4

| Example | M Intensity | M size (nm) | C/T intensity | C/T size (nm) | % C/T | XRD Average Size (nm) | Lattice Parameter |
|---|---|---|---|---|---|---|---|
| Ex 4 Initial | 8 | 3.4 | 100 | 11 | 63 | 8.2 | 5.11 |

Examples 5a-5i

Precursor solutions were prepared by combining zirconium acetate, yttrium acetate, lanthanum acetate, and DI water with stirring. The amounts of each precursor component are shown in Table 5. The resulting solutions (19% solids) were placed into general purpose acid digestion bombs with Teflon cups (Parr Model number 4749). The acid digestion bomb was placed in a forced air oven at a temperature of 225° C. for 4 hours.

TABLE 5

Preparation of Examples 5a-5i

| Precursor Components | Amount (grams) | Solids (wt %) | Temp (° C.) | Time (hr) | Particle Content | Mole percent |
|---|---|---|---|---|---|---|
| Ex 5a Zr acetate | 100 | 19 | 225 | 4 | $ZrO_2$ | 97.77 |
| Y acetate | 2.69 | | | | $Y_2O_3$ | 2.22 |
| La acetate | 0.0124 | | | | $La_2O_3$ | 0.0097 |
| DI water | 97.82 | | | | | |
| Ex 5b Zr acetate | 100 | 19 | 225 | 4 | $ZrO_2$ | 97.75 |
| Y acetate | 2.69 | | | | $Y_2O_3$ | 2.22 |
| La acetate | 0.0372 | | | | $La_2O_3$ | 0.0293 |
| DI water | 97.1 | | | | | |
| Ex 5c Zr acetate | 100 | 19 | 225 | 4 | ZrO2 | 96.68 |
| Y acetate | 2.69 | | | | $Y_2O_3$ | 2.22 |
| La acetate | 0.124 | | | | $La_2O_3$ | 0.0979 |
| DI water | 101.31 | | | | | |
| Ex 5d Zr acetate | 100 | 19 | 225 | 4 | $ZrO_2$ | 97.63 |
| Y acetate | 2.69 | | | | $Y_2O_3$ | 2.22 |
| La acetate | 0.1865 | | | | $La_2O_3$ | 0.1472 |
| DI water | 99.56 | | | | | |
| Ex 5e Zr acetate | 100 | 19 | 225 | 4 | $ZrO_2$ | 97.54 |
| Y acetate | 2.69 | | | | $Y_2O_3$ | 2.22 |
| La acetate | 0.3109 | | | | $La_2O_3$ | 0.2451 |
| DI water | 101.21 | | | | | |
| Ex 5f Zr acetate | 100 | 19 | 225 | 4 | $ZrO_2$ | 97.29 |
| Y acetate | 2.69 | | | | $Y_2O_3$ | 2.12 |
| La acetate | 0.6162 | | | | $La_2O_3$ | 0.48 |
| DI water | 99.43 | | | | | |
| Ex 5g Zr acetate | 100 | 19 | 225 | 4 | ZrO2 | 96.81 |
| Y acetate | 2.69 | | | | $Y_2O_3$ | 2.2 |
| La acetate | 1.25 | | | | $La_2O_3$ | 0.99 |
| DI water | 97 | | | | | |
| Ex 5h Zr acetate | 100 | 19 | 225 | 4 | $ZrO_2$ | 95.86 |
| Y acetate | 2.69 | | | | $Y_2O_3$ | 2.18 |
| La acetate | 2.5 | | | | $La_2O_3$ | 1.96 |
| DI water | 99 | | | | | |
| Ex 5i Zr acetate | 100 | 19 | 225 | 4 | $ZrO_2$ | 94.88 |
| Y acetate | 2.69 | | | | $Y_2O_3$ | 2.16 |
| La acetate | 3.84 | | | | $La_2O_3$ | 2.96 |
| DI water | 103 | | | | | |

Example 5a was a stable and slightly cloudy sol. The Z-average particle size was 28.8 nanometers and the volume-average particle size was 19.18 nanometers. The particles were crystalline and the x-ray diffraction data is summarized in Table 6.

Example 5b was a stable and slightly cloudy sol. The Z-average particle size was 30.39 nanometers and the volume-average particle size was bimodal with one peak at 8.124 nanometers (48.0 volume percent) and another peak at 21.11 nanometers (52.0 volume percent). The particles were crystalline and the x-ray diffraction data is summarized in Table 6.

Example 5c was a stable and slightly cloudy sol. The Z-average particle size was 31.65 nanometers and the volume-average particle size was 21.27 nanometers. The particles were crystalline and the x-ray diffraction data is summarized in Table 6.

Example 5d was a stable and slightly cloudy sol. The Z-average particle size was 32.2 nanometers and the volume-average particle size was 21.78 nanometers. The particles were crystalline and the x-ray diffraction data is summarized in Table 6.

Example 5e was a stable and slightly cloudy sol. The Z-average particle size was 38.31 nanometers and the volume-average particle size was 21.28 nanometers. The particles were crystalline and the x-ray diffraction data is summarized in Table 6.

Example 5f was a stable and slightly cloudy sol. The Z-average particle size was 47.8 nanometers and the volume-average particle size was 29.36 nanometers. The particles were crystalline and the x-ray diffraction data is summarized in Table 6.

Example 5g was a stable and slightly cloudy sol. The Z-average particle size was 66 nanometers and the volume-average particle size was 48.5 nanometers. The particles were crystalline and the x-ray diffraction data is summarized in Table 6.

Example 5h was a stable and slightly cloudy sol. The Z-average particle size was 46 nanometers and the volume-average particle size was 20.97 nanometers. The particles were crystalline and the x-ray diffraction data is summarized in Table 6. The abbreviation "ND" means not detected.

Example 5i was a stable and slightly cloudy sol. The Z-average particle size was 39.6 nanometers and the volume-average particle size was 22.09 nanometers. The particles were crystalline and the x-ray diffraction data is summarized in Table 6.

TABLE 6

X-ray Diffraction Data for Examples 5a-5i

| Example | M Intensity | M size (nm) | C/T intensity | C/T size (nm) | % C/T | XRD Average Size (nm) | Lattice Parameter (A) |
|---|---|---|---|---|---|---|---|
| Ex 5a | 14 | 4.2 | 100 | 12.4 | 64 | 9.4 | 5.10 |
| Ex 5b | 13 | 5.8 | 100 | 15.6 | 56 | 11.3 | 5.10 |
| Ex 5c | 14 | 4.8 | 100 | 14.0 | 60 | 10.3 | 5.10 |
| Ex 5d | 16 | 4.7 | 100 | 11.7 | 59 | 8.8 | 5.10 |
| Ex 5e | 10 | 5.4 | 100 | 18.3 | 60 | 13.1 | 5.10 |
| Ex 5f | 12 | 5.0 | 100 | 9.9 | 77 | 8.8 | 5.12 |
| Ex 5g | 7 | 5.5 | 100 | 10.4 | 63 | 8.6 | 5.10 |
| Ex 5h | ND | — | 100 | 9.0 | 100 | 9.0 | 5.12 |
| Ex 5i | ND | — | 100 | 8.5 | 100 | 8.5 | 5.13 |

Incorporation of yttrium and lanthanum is confirmed by the absence of peaks due to yttrium oxide and lanthanum oxide. There is a nominal increase in the lattice parameter as the lanthanum content increases. This is in agreement with lanthanum being incorporated and expanding the crystal lattice.

Example 6: $ZrO_2/Y_2O_3/La_2O_3$ (92.7/2.3/5.00)

A precursor solution was prepared by combining zirconium acetate (650 grams), yttrium acetate (19.38 grams), lanthanum acetate (44.52 grams), and DI water (792 grams) with stirring. The resulting solution (19 weight percent solids) was pumped at a rate of 2.87 mL/min through Hydrothermal Reactor B. The temperature was 240° C. and the average residence time was 42 minutes. A stable zirconia sol was obtained.

The particle size of the particles within the sol was measured by PCS. The Z-average particle size was 35.79 nanometers and the volume-average particle size was 23.34 nanometers.

A portion of the sol was dialyzed for 24 to 48 hours with a large excess of water (Spectra/Por Dialysis membrane MWCO 12-14,000 available from Spectrum Laboratories, Inc (Rancho Dominguez Calif.)). Based on ICP analysis of the sols before and after dialysis, 62.88 mole percent of the lanthanum was retained.

Example 7: $ZrO_2/CeO_2$ (98.22/1.78)

A precursor solution was prepared by combining zirconium acetate (50 grams), cerium acetate (0.411 grams), and DI water (70.6 grams) with stirring. The resulting solution (15 weight percent solids) was placed into a general purpose acid digestion bomb with Teflon cup (Parr Model number 4749). The acid digestion bomb was placed in a forced air oven at a temperature of 200° C. for 4 hours. A slightly cloudy and stable zirconia sol was obtained.

Example 8: $ZrO_2/CeO_2/La_2O_3$ (85.64/11.68/2.68)

A precursor solution was prepared by combining zirconium acetate (100 grams), cerium acetate (8.3 grams), lanthanum acetate (3.84 grams), and DI water (110.7 grams) with stirring. The resulting solution (19 weight percent solids) was placed into a general purpose acid digestion bomb with Teflon cup (Parr Model number 4749). The acid digestion bomb was placed in a forced air oven at a temperature of 225° C. for 4 hours. A slightly cloudy and stable zirconia sol with a small amount of settled material was obtained. The sol had a yellow color.

The particle size of the sol was measured by PCS. The Z-average particle size was 21.93 nanometers and the volume-average particle size was 16.07 nanometers.

Example 9a: $ZrO_2/Y_2O_3/CeO_2$ (96.54/2.19/1.26)

A precursor solution was prepared by combining zirconium acetate (50 grams), yttrium acetate (1.34 grams), cerium acetate (0.411 grams), and DI water (72.5 grams) with stirring. The resulting solution (15 weight percent solids) was placed into a general purpose acid digestion bomb with Teflon cup (Parr Model number 4749). The acid digestion bomb was placed in a forced air oven at a temperature of 225° C. for 4 hours. A slightly cloudy stable zirconia sol was obtained.

Example 9b: $ZrO_2/Y_2O_3/CeO_2$ (97.67/1.05/1.28)

A precursor solution was prepared by combining zirconium acetate (50 grams), yttrium Acetate (0.66 grams), cerium acetate (0.411 grams), and DI water (71.5 grams) with stirring. The resulting solution (15 weight percent solids) was placed into a general purpose acid digestion bomb with Teflon cup (Parr Model number 4749). The acid digestion bomb was placed in a forced air oven at a temperature of 225° C. for 4 hours. A slightly cloudy and stable zirconia sol was obtained.

Example 10a: $ZrO_2/Er_2O_3$ (99.34/0.66)

A precursor solution was prepared by combining zirconium acetate (12.1 grams), erbium nitrate (0.1289 grams), and DI water (17.9 grams) with stirring. The resulting solution (15 weight percent solids) was placed into a general purpose acid digestion bomb with Teflon cup (Parr Model number 4749). The acid digestion bomb was placed in a forced air oven at a temperature of 200° C. for 4 hours. A cloudy and stable zirconia sol was obtained. The sol was pink colored.

The particle size of the sol was measured by PCS. The Z-average particle size was 31.68 nanometers and the volume-average particle size was 25.23 nanometers.

Example 10b: $ZrO_2/Er_2O_3$ (99.0/0.99)

A precursor solution was prepared by combining zirconium acetate (121.1 grams), erbium nitrate (1.94 grams), and DI water (179 grams) with stirring. The resulting solution (15 weight percent solids) was placed into a general purpose acid digestion bomb with Teflon cup (Parr Model number 4749). The acid digestion bomb was placed in a forced air oven at a temperature of 200° C. for 4 hours. A cloudy and stable zirconia sol was obtained. The sol was pink colored.

Example 10c: $ZrO_2/Er_2O_3$ (98.67/1.33)

A precursor solution was prepared by combining zirconium acetate (12.1 grams), erbium nitrate (0.2610 grams), and DI water (17.9 grams) with stirring. The resulting solution (15 weight percent solids) was placed into a general purpose acid digestion bomb with Teflon cup (Parr Model number 4749). The acid digestion bomb was placed in a forced air oven at a temperature of 200° C. for 4 hours. A cloudy and stable zirconia sol was obtained. The sol was pink colored.

The particle size of the sol was measured by PCS. The Z-average particle size was 31.98 nanometers and the volume-average particle size was 24.53 nanometers.

Example 10d: $ZrO_2/Er_2O_3$ (97.98/2.02)

A precursor solution was prepared by combining zirconium acetate (12.1 grams), erbium nitrate (0.401 grams), and DI water (17.9 grams) with stirring. The resulting solution (15 weight percent solids) was placed into a general purpose acid digestion bomb with Teflon cup (Parr Model number 4749). The acid digestion bomb was placed in a forced air oven at a temperature of 200° C. for 4 hours. A cloudy and stable zirconia sol was obtained. The sol was pink colored.

The particle size of the sol was measured by PCS. The Z-average particle size was 42.83 nm and the volume-average particle size was 30.27 nanometers.

Example 11a: $ZrO_2/Y_2O_3/Er_2O_3$ (97.11/2.22/0.67)

A precursor solution was prepared by combining zirconium acetate (11.8 grams), yttrium acetate (0.3279 grams), erbium nitrate (0.1270 grams), and DI water (17.9 grams) with stirring. The resulting solution (15 weight percent solids) was placed into a general purpose acid digestion bomb with Teflon cup (Parr Model number 4749). The acid digestion bomb was placed in a forced air oven at a temperature of 200° C. for 4 hours. A cloudy and stable zirconia sol was obtained. The sol was pink colored.

The particle size of the sol was measured by PCS. The Z-average particle size was 27.88 nanometers and the volume-average particle size was 21.37 nanometers.

Example 11b: $ZrO_2/Y_2O_3/Er_2O_3$ (96.46/2.19/1.35)

A precursor solution was prepared by combining zirconium acetate (11.8 grams), yttrium acetate (0.3279 grams), erbium nitrate (0.2601 grams), and DI water (17.9 grams) with stirring. The resulting solution (15 weight percent solids) was placed into a general purpose acid digestion bomb with Teflon cup (Parr Model number 4749). The acid digestion bomb was placed in a forced air oven at a temperature of 200° C. for 4 hours. A cloudy stable zirconia sol was obtained. The sol was pink colored.

The particle size of the sol was measured by PCS. The Z-average particle size was 31.26 nanometers and the volume-average particle size was 23.79 nanometers.

Example 11c: $ZrO_2/Y_2O_3/Er_2O_3$ (95.77/2.18/2.05)

A precursor solution was prepared by combining zirconia acetate (11.8 grams), yttrium acetate (0.3279 grams), erbium nitrate (0.3992 grams), and DI water (17.9 grams) with stirring. The resulting solution (15 weight percent solids) was placed into a general purpose acid digestion bomb with Teflon cup (Parr Model number 4749). The acid digestion bomb was placed in a forced air oven at a temperature of 200° C. for 4 hours. A cloudy stable zirconia sol was obtained. The sol was pink colored.

The particle size of the sol was measured by PCS. The Z-average particle size was 47.08 nanometers and the volume-average particle size was 32.72 nanometers.

Example 12: $ZrO_2/Y_2O_3/CeO_2$ (91.85/2.27/5.88)

Precursor solutions were prepared by combining zirconium acetate (1000 grams), yttrium acetate (27.8 grams), and DI water (1548 grams) with stirring. The resulting solution was 0.707 millimoles $ZrO_2$/grams and 0.017 millimoles $Y_2O_3$/grams. The zirconia/yttria precursor (200 grams) was combined with cerium acetate (3.13 grams) with stirring. The precursor was placed into general purpose acid digestion bombs with Teflon cups (Parr Model number 4749). The acid digestion bomb was placed in a forced air oven at 200° C. for 4 hours. A stable, somewhat cloudy, and yellowish $ZrO_2$ sol was obtained.

The particle size of the sol was measured by PCS. The Z-average particle size was 45.21 nanometers and the volume-average particle size was bimodal with one peak at 8.53 nanometers (31 volume percent) and 28.17 nanometers (69 volume percent).

Example 13: $ZrO_2/Y_2O_3/CeO_2$ (93.3/2.31/4.39)

Precursor solutions were prepared by combining zirconium acetate (1000 grams), yttrium acetate (27.8 grams), and DI water (1548 grams) with stirring. The resulting solution was 0.707 millimoles $ZrO_2$/gram and 0.017 millimoles $Y_2O_3$/gram. The zirconia/yttria precursor (15 grams) was combined with cerium acetate (0.1723 grams) with stirring. The precursor was placed into general purpose acid digestion bombs with Teflon cups (Parr Model number 4749). The acid digestion bomb was placed in a forced air oven at 200° C. for 4 hours. A stable, somewhat cloudy, and yellowish $ZrO_2$ sol was obtained.

The particle size of the particles within the sol was measured by PCS. The Z-average particle size was 37.29 nanometers and the volume-average particle size was 26.83 nanometers.

Example 14: $ZrO_2/Y_2O_3/CeO_2$ (94.75/2.35/2.91)

Precursor solutions were prepared by combining zirconium acetate (1000 grams), yttrium acetate (27.8 grams), and DI water (1548 grams) with stirring. The resulting solution was 0.707 millimoles $ZrO_2$/gram and 0.017 millimoles $Y_2O_3$/gram. The zirconia/yttria precursor (200 grams) was combined with cerium acetate (3.13 grams) with stirring. The precursor was placed into general purpose acid digestion bombs with Teflon cups (Parr Model number 4749). The acid digestion bomb was placed in a forced air oven at 200° C. for 4 hours. A stable, somewhat cloudy, and yellowish $ZrO_2$ sol was obtained.

The particle size of the sol was measured by PCS. The Z-average particle size was 30.72 nanometers and the volume-average particle size was 23.59 nanometers.

Example 15a-15h: $ZrO_2/Y_2O_3$ Plus Various Lanthanides

Precursor solutions were prepared by combining zirconium acetate (1000 grams), yttrium acetate (27.8 grams), and DI water (1548 grams) with stirring. The resulting solution was 0.707 millimoles $ZrO_2$/gram and 0.017 millimoles $Y_2O_3$/grams. The zirconia/yttria precursor was combined with lanthanide salts as described in Table 7. The precursors were placed into general purpose acid digestion bombs with Teflon cups (Parr Model number 4749). The acid digestion bomb was placed in a forced air oven for the temperature and time noted in Table 7.

TABLE 7

Composition of Examples 15a-15h

| | Precursor Components | Amount (grams) | Solids (wt %) | Temp (° C.) | Time (hr) | Particle Content | Mole percent |
|---|---|---|---|---|---|---|---|
| Ex 15a | Precursor | 12.5 | 15 | 200 | 4 | $ZrO_2$ | 97.36 |
| | | | | | | $Y_2O_3$ | 2.41 |
| | Nd Nitrate | 0.0177 | | | | $Nd_2O_3$ | 0.23 |
| Ex 15b | Precursor | 12.5 | 15 | 200 | 4 | $ZrO_2$ | 97.37 |
| | | | | | | $Y_2O_3$ | 2.41 |
| | Sm Nitrate | 0.0172 | | | | $Sm_2O_3$ | 0.22 |
| Ex 15c | Precursor | 12.5 | 15 | 200 | 4 | $ZrO_2$ | 97.17 |
| | | | | | | $Y_2O_3$ | 2.4 |
| | Nd Nitrate | 0.0329 | | | | $Nd_2O_3$ | 0.42 |
| Ex 15d | Precursor | 12.5 | 15 | 200 | 4 | $ZrO_2$ | 97.24 |
| | | | | | | $Y_2O_3$ | 2.4 |
| | Tm Nitrate | 0.0302 | | | | $Tm_2O_3$ | 0.35 |
| Ex 15e | Precursor | 12.5 | 15 | 200 | 4 | $ZrO_2$ | 97.19 |
| | | | | | | $Y_2O_3$ | 2.4 |
| | Eu Nitrate | 0.0333 | | | | $Eu_2O_3$ | 0.41 |
| Ex 15f | Precursor | 12.5 | 15 | 200 | 4 | $ZrO_2$ | 96.78 |
| | | | | | | $Y_2O_3$ | 2.38 |
| | Ce Acetate | 0.0261 | | | | $CeO_2$ | 0.83 |
| Ex 15g | Precursor | 12.5 | 15 | 200 | 4 | $ZrO_2$ | 97.19 |
| | | | | | | $Y_2O_3$ | 2.41 |
| | Sm Nitrate | 0.319 | | | | $Sm_2O_3$ | 0.41 |
| Ex 15h | Precursor | 12.5 | 15 | 200 | 4 | $ZrO_2$ | 97.22 |
| | | | | | | $Y_2O_3$ | 2.40 |
| | Er Nitrate | 0.0292 | | | | $Er_2O_3$ | 0.37 |

Example 15a was a stable and slightly cloudy zirconia-based sol. The Z-average particle size was 29.96 nanometers and the volume-average particle size was 21.44 nanometers.

Example 15b was a stable and slightly cloudy zirconia-based sol. The Z-average particle size was 27.51 nanometers and the volume-average particle size was 21.37 nanometers.

Example 15c was a stable and slightly cloudy zirconia-based sol. The Z-average particle size was 29.1 nanometers and the volume-average particle size was 22.24 nanometers.

Example 15d was a stable and slightly cloudy zirconia-based sol. The Z-average particle size was 29.11 nanometers and the volume-average particle size was 22.14 nanometers.

Example 15e was a stable and slightly cloudy zirconia-based sol. When irradiated with light having a wavelength of 254 nanometers, the sample emitted orange/pink fluorescent light. The Z-average particle size was 29.87 nanometers and the volume-average particle size was 21.31 nanometers.

Example 15f was a stable and slightly cloudy zirconia-based sol. When irradiated with light having a wavelength of 254 nanometers, the sample emitted purple fluorescent light. The Z-average particle size was 30.39 nanometers and the volume-average particle size was 22.56 nanometers.

Example 15g was a stable and slightly cloudy zirconia-based sol. When irradiated with light having a wavelength of 254 nanometers, the sample emitted purple fluorescent light. The Z-average particle size was 27.39 nanometers and the volume-average particle size was 20.97 nanometers.

Example 15h was a stable and slightly cloudy zirconia-based sol. The Z-average particle size was 28.53 nanometers and the volume-average particle size was 22.62 nanometers.

Example 16a-16j: $ZrO_2/Y_2O_3$ Plus Various Lanthanides

Precursor solutions were prepared by combining zirconium acetate (800 grams), yttrium acetate (22.24 grams), and DI water (1239 grams) with stirring. The resulting solution was 0.701 millimoles $ZrO_2$/gram and 0.016 millimoles $Y_2O_3$/gram. The zirconia/yttria precursor was combined with lanthanide salts as described in Table 8. The precursors were placed into general purpose acid digestion bombs with Teflon cups (Parr Model number 4749). The acid digestion bomb was placed in a forced air oven for the temperature and time noted in Table 8.

TABLE 8

Preparation of Examples 16a-16j

| | Precursor Components | Amounts (grams) | Solids (wt %) | Temp (° C.) | Time (hr) | Particle Content | Mole Percent |
|---|---|---|---|---|---|---|---|
| Ex 16a | Precursor | 12.5 | 15 | 200 | 4 | $ZrO_2$ | 97.13 |
| | | | | | | $Y_2O_3$ | 2.22 |
| | Sm Nitrate | 0.0506 | | | | $Sm_2O_3$ | 0.65 |

TABLE 8-continued

Preparation of Examples 16a-16j

| | Precursor Components | Amounts (grams) | Solids (wt %) | Temp (° C.) | Time (hr) | Particle Content | Mole Percent |
|---|---|---|---|---|---|---|---|
| Ex 16b | Precursor | 12.5 | 15 | 200 | 4 | $ZrO_2$ | 96.90 |
| | | | | | | $Y_2O_3$ | 2.21 |
| | Ce Acetate | 0.0279 | | | | $CeO_2$ | 0.89 |
| Ex 16c | Precursor | 12.5 | 15 | 200 | 4 | $ZrO_2$ | 97.32 |
| | | | | | | $Y_2O_3$ | 2.22 |
| | Eu Nitrate | 0.0373 | | | | $Eu_2O_3$ | 0.46 |
| Ex 16d | Precursor | 12.5 | 15 | 200 | 4 | $ZrO_2$ | 97.34 |
| | | | | | | $Y_2O_3$ | 2.22 |
| | Er Nitrate | 0.0336 | | | | $Er_2O_3$ | 0.43 |
| Ex 16e | Precursor | 12.5 | 15 | 200 | 4 | $ZrO_2$ | 96.81 |
| | | | | | | $Y_2O_3$ | 2.21 |
| | Sm Nitrate | 0.0763 | | | | $Sm_2O_3$ | 0.98 |
| Ex 16f | Precursor | 12.5 | 15 | 200 | 4 | $ZrO_2$ | 96.0 |
| | | | | | | $Y_2O_3$ | 2.19 |
| | Ce Acetate | 0.0572 | | | | $CeO_2$ | 1.81 |
| Ex 16g | Precursor | 12.5 | 15 | 200 | 4 | $ZrO_2$ | 96.90 |
| | | | | | | $Y_2O_3$ | 2.21 |
| | Eu Nitrate | 0.0725 | | | | $Eu_2O_3$ | 0.89 |
| Ex 16h | Precursor | 12.5 | 15 | 200 | 4 | $ZrO_2$ | 96.95 |
| | | | | | | $Y_2O_3$ | 2.21 |
| | Er Nitrate | 0.0655 | | | | $Er_2O_3$ | 0.84 |
| Ex 16i | Precursor | 12.5 | 15 | 200 | 4 | $ZrO_2$ | 97.0 |
| | | | | | | $Y_2O_3$ | 2.21 |
| | Tm Nitrate | 0.0664 | | | | $Tm_2O_3$ | 0.79 |
| Ex 16j | Precursor | 12.5 | 15 | 200 | 4 | $ZrO_2$ | 96.85 |
| | | | | | | $Y_2O_3$ | 2.21 |
| | Nd Nitrate | 0.0721 | | | | $Nd_2O_3$ | 0.93 |

Example 16a was a stable and clear zirconia-based sol. The Z-average particle size was 31.92 nanometers and the volume-average particle size was 22.84 nanometers.

Example 16b was a stable and slightly cloudy zirconia-based sol. When irradiated with light having a wavelength of 254 nanometers, the sample emitted purple fluorescent light. The Z-average particle size was 34.14 nanometers and the volume-average particle size was 25.91 nanometers.

Example 16c was a stable and slightly cloudy zirconia-based sol. When irradiated with light having a wavelength of 254 nanometers, the sample emitted orange fluorescent light. The Z-average particle size was 27.08 nanometers and the volume-average particle size was 21.35 nanometers.

Example 16d was a stable and slightly cloudy zirconia-based sol. The Z-average particle size was 24.22 nanometers and the volume-average particle size was 19.28 nanometers.

Example 16e was a stable and slightly cloudy zirconia-based sol. The Z-average particle size was 30.65 nanometers and the volume-average particle size was 22.89 nanometers.

Example 16f was a stable and slightly cloudy zirconia-based sol. The Z-average particle size was 41.21 nanometers and the volume-average particle size was 29.01 nanometers.

Example 16g was a stable and slightly cloudy zirconia-based sol. When irradiated with light having a wavelength of 254 nanometers, the sample emitted orange fluorescent light.

Example 16h was a stable and slightly cloudy zirconia-based sol. The Z-average particle size was 28.01 nanometers and the volume-average particle size was 21.55 nanometers.

Example 16i was a stable and slightly cloudy zirconia-based sol. The Z-average particle size was 26.78 nanometers and the volume-average particle size was 20.88 nanometers.

Example 16j was a stable and slightly cloudy zirconia-based sol. The Z-average particle size was 33.69 nanometers and the volume-average particle size was 25.92 nanometers.

Example 17a-17m: $ZrO_2/Y_2O_3$ Plus Various Lanthanides

Precursor solutions were prepared by combining zirconium acetate (1000 grams) and DI water (1503 grams) with stirring. The resulting solution was 0.727 millimoles $ZrO_2$/grams. The zirconia precursor was combined with lanthanide salts as described in Table 9. The precursors were placed into general purpose acid digestion bombs with Teflon cups (Parr Model number 4749). The acid digestion bomb was placed in a forced air oven for the temperature and time noted in Table 9.

TABLE 9

Preparation of Examples 17a-17m

| | Precursor Components | Amount (grams) | Solids (wt %) | Temp (° C.) | Time (hr) | Particle Content | Mole percent |
|---|---|---|---|---|---|---|---|
| Ex 17a | Precursor | 30 | 15 | 200 | 4 | $ZrO_2$ | 99.96 |
| | Nd Nitrate | 0.0076 | | | | $Nd_2O_3$ | 0.04 |
| Ex 17b | Precursor | 30 | 15 | 200 | 4 | $ZrO_2$ | 99.96 |
| | Tm Nitrate | 0.00693 | | | | $Tm_2O_3$ | 0.04 |

TABLE 9-continued

Preparation of Examples 17a-17m

|  | Precursor Components | Amount (grams) | Solids (wt %) | Temp (° C.) | Time (hr) | Particle Content | Mole percent |
|---|---|---|---|---|---|---|---|
| Ex 17c | Precursor | 30 | 15 | 200 | 4 | $ZrO_2$ | 99.92 |
|  | Ce Acetate | 0.00603 |  |  |  | $CeO_2$ | 0.08 |
| Ex 17d | Precursor | 30 | 15 | 200 | 4 | $ZrO_2$ | 99.96 |
|  | Er Nitrate | 0.00673 |  |  |  | $Er_2O_3$ | 0.04 |
| Ex 17e | Precursor | 30 | 15 | 200 | 4 | $ZrO_2$ | 99.96 |
|  | Tb Nitrate | 0.0072 |  |  |  | $Tb_2O_3$ | 0.04 |
| Ex 17f | Precursor | 30 | 15 | 200 | 4 | $ZrO_2$ | 99.92 |
|  | Tb Nitrate | 0.0072 |  |  |  | $Tb_2O_3$ | 0.04 |
|  | Eu Nitrate | 0.0077 |  |  |  | $Eu_2O_3$ | 0.04 |
| Ex 17g | Precursor | 30 | 15 | 200 | 4 | $ZrO_2$ | 99.9 |
|  | Nd Nitrate | 0.0177 |  |  |  | $Nd_2O_3$ | 0.1 |
| Ex 17h | Precursor | 30 | 15 | 200 | 4 | $ZrO_2$ | 99.92 |
|  | Tm Nitrate | 0.0161 |  |  |  | $Tm_2O_3$ | 0.08 |
| Ex 17i | Precursor | 30 | 15 | 200 | 4 | $ZrO_2$ | 99.91 |
|  | Eu Nitrate | 0.0179 |  |  |  | $Eu_2O_3$ | 0.09 |
| Ex 17j | Precursor | 30 | 15 | 200 | 4 | $ZrO_2$ | 99.91 |
|  | Ce Acetate | 0.0141 |  |  |  | $CeO_2$ | 0.09 |
| Ex 17k | Precursor | 30 | 15 | 200 | 4 | $ZrO_2$ | 99.91 |
|  | Sm Nitrate | 0.0172 |  |  |  | $Sm_2O_3$ | 0.09 |
| Ex 17l | Precursor | 30 | 15 | 200 | 4 | $ZrO_2$ | 99.92 |
|  | Er Nitrate | 0.0157 |  |  |  | $Er_2O_3$ | 0.08 |
| Ex 17m | Precursor | 30 | 15 | 200 | 4 | $ZrO_2$ | 99.91 |
|  | Tb Nitrate | 0.0169 |  |  |  | $Tb_2O_3$ | 0.09 |

Example 17a was a stable and slightly cloudy zirconia-based sol. The Z-average particle size was 38.36 nanometers and the volume-average particle size was 30.1 nanometers.

Example 17b was a stable and slightly cloudy zirconia-based sol. The Z-average particle size was 39.22 nanometers and the volume-average particle size was 30.67 nanometers.

Example 17c was a stable and slightly cloudy zirconia-based sol. The Z-average particle size was 37.93 nanometers and the volume-average particle size was 29.98 nanometers.

Example 17d was a stable and slightly cloudy zirconia-based sol. The Z-average particle size was 40.65 nanometers and the volume-average particle size was 30.99 nanometers.

Example 17e was a stable and slightly cloudy zirconia-based sol. When irradiated with light having a wavelength of 254 nanometers, the sample emitted green fluorescent light. The Z-average particle size was 37.64 nanometers and the volume-average particle size was 29.62 nanometers.

Example 17f was a stable and slightly cloudy zirconia-based sol. When irradiated with light having a wavelength of 254 nanometers, the sample emitted green fluorescent light. The Z-average particle size was 42.13 nanometers and the volume-average particle size was 32.41 nanometers.

Example 17g was a stable and slightly cloudy zirconia-based sol. When irradiated with light having a wavelength of 254 nanometers, the sample emitted purple fluorescent light. The Z-average particle size was 38.94 nanometers and the volume-average particle size was 31.16 nanometers.

Example 17h was a stable and slightly cloudy zirconia-based sol. When irradiated with light having a wavelength of 254 nanometers, the sample emitted purple fluorescent light. The Z-average particle size was 36.93 nanometers and the volume-average particle size was 29.63 nanometers.

Example 17i was a stable and slightly cloudy zirconia-based sol. When irradiated with light having a wavelength of 254 nanometers, the sample emitted pink/red fluorescent light. The Z-average particle size was 38.66 nanometers and the volume-average particle size was 31.57 nanometers.

Example 17j was a stable and slightly cloudy zirconia-based sol. The Z-average particle size was 38.94 nanometers and the volume-average particle size was 31.72 nanometers.

Example 17k was a stable and slightly cloudy zirconia-based sol. The Z-average particle size was 37.17 nanometers and the volume-average particle size was 29.94 nanometers.

Example 17l was a stable and slightly cloudy zirconia-based sol. When irradiated with light having a wavelength of 254 nanometers, the sample emitted a slightly green fluorescent light.

Example 17m was a stable and slightly cloudy zirconia-based sol. When irradiated with light having a wavelength of 254 nanometers, the sample emitted yellow/green fluorescent light. The Z-average particle size was 33.71 nanometers and the volume-average particle size was 25.03 nanometers.

Example 18a-18d: $ZrO_2/Y_2O_3$ Plus Various Lanthanides

Precursor solutions were prepared by combining zirconium acetate (1000 grams) and DI water (1478 grams) with stirring. The resulting solution was 0.735 millimole $ZrO_2$/gram. The zirconia precursor was combined with lanthanide salts as described in Table 10. The precursors were placed into general purpose acid digestion bombs with Teflon cups (Parr Model number 4749). The acid digestion bomb was placed in a forced air oven for the temperature and time noted in Table 10.

TABLE 9

Preparation of Examples 18a-18d

|  | Precursor Components | Amount (grams) | Solids (wt %) | Temp (° C.) | Time (hr) | Particle Content | Mole percent |
|---|---|---|---|---|---|---|---|
| Ex 18a | Precursor | 12.5 | 15 | 200 | 4 | $ZrO_2$ | 99.04 |
|  | Sm Nitrate | 0.0767 |  |  |  | $Sm_2O_3$ | 0.96 |
| Ex 18b | Precursor | 12.5 | 15 | 200 | 4 | $ZrO_2$ | 98.22 |
|  | Ce Acetate | 0.0575 |  |  |  | $CeO_2$ | 1.78 |
| Ex 18c | Precursor | 12.5 | 15 | 200 | 4 | $ZrO_2$ | 98.22 |
|  | Eu Nitrate | 0.0728 |  |  |  | $Eu_2O_3$ | 0.86 |
| Ex 18d | Precursor | 12.5 | 15 | 200 | 4 | $ZrO_2$ | 99.17 |
|  | Er Nitrate | 0.0663 |  |  |  | $Er_2O_3$ | 0.83 |

Example 18a was a stable and slightly cloudy zirconia-based sol. The Z-average particle size was 37.1 nanometers and the volume-average particle size was 27.8 nanometers.

Example 18b was a stable and slightly cloudy zirconia-based sol. The Z-average particle size was 48.75 nanometers and the volume-average particle size was 39.53 nanometers.

Example 18c was a stable and slightly cloudy zirconia-based sol. When irradiated with light having a wavelength of 254 nanometers, the sample emitted orange fluorescent light. The Z-average particle size was 34.14 nanometers and the volume-average particle size was 26.16 nanometers.

Example 18d was a stable and slightly cloudy zirconia-based sol. The Z-average particle size was 30.54 nanometers and the volume-average particle size was 24.2 nanometers.

Example 19: $ZrO_2/Y_2O_3/La_2O_3$ (86/12/2)

A precursor solution was prepared by combining zirconium acetate (700 grams), yttrium acetate (116.97 grams), lanthanum acetate (20.65 grams), and DI water (1032.5 grams) with stirring. The resulting solution (19 weight percent solids) was pumped at a rate of 2.87 mL/min through Hydrothermal Reactor B. The temperature was 225° C. and the average residence time was 42 minutes. A slightly cloudy stable zirconia sol was obtained. The particle size of the sol was measured by PCS. The Z-average particle size was 14.13 nanometers and the volume-average particle size was 9.58 nanometers.

Example 20: Composite of Zirconia-Based Particles (ZrO2/Y2O3/La2O3 95.7/2.3/2.0) in Curable Resin A precursor solution was prepared by combining zirconium acetate (2000 grams), yttrium acetate (57.6 grams), lanthanum acetate (53.1 grams), and DI water (2166 grams) with stirring. The resulting solution (19 weight percent solids) was pumped at a rate of 11.48 mL/min through Hydrothermal Reactor A. The temperature was 225° C. and the average residence time was 42 minutes. A clear and stable zirconia sol was obtained.

The resulting zirconia-based sol (150 grams) and MEEAA (1.998 grams) were charged to a 500 ml round bottom flask. This was concentrated via rotary distillation to a total of 63.4 grams. Methoxypropanol (35.5 grams), HEA-succinate (1.61 grams), Resin 1 (17.17 grams), and PROSTABB (0.3 grams solution that was 5.0 weight percent in water) were charged to the flask. The methoxypropanol and water were then removed via rotary evaporation. The resulting mixture was a translucent and fairly viscous dispersion.

The resulting composition contained approximately 45 weight percent lanthanum doped $ZrO_2$ particles dispersed in a curable resin.

Example 21: Sintered Body

The sol prepared and dialyzed in Example 1 was dried at 50° C. During drying the sol formed a rigid gel and broke apart into small granules a few millimeters in size. One of these granules was heated at a rate of 2° C./min to 1400° C. in a dilatometer so that the shrinkage occurring during heating could be recorded (DIL 402 PC, Netzsch Instruments, Inc., Burlington, Mass. 01803). The dilatometer trace showed that 12.3% linear shrinkage occurred during heating to 600° C. Much of this shrinkage can be attributed to volatilization of moisture and the organic components of the sol. The dilatometer trace showed an additional shrinkage of 13.9% between 600° C. and 1400° C. Since all of the volatilization is completed below 600° C. additional shrinkage at higher temperature indicates that the sol particles are sintering together to form a single body. Void volume between the particles is reduced during sintering resulting in the additional shrinkage.

We claim:

1. A zirconia-based particles comprising: a) 0.02 to 20 mole percent lanthanide element oxide based on total moles of inorganic oxide in the zirconia-based particles; b) 0.1 to 15 mole percent yttrium oxide based on total moles of inorganic oxide in the zirconia-based particles; and c) at least 80 mole percent zirconium oxide based on total moles of inorganic oxide in the zirconia-based particles; and wherein the zirconia-based particles are crystalline, doped with lanthanide element and yttrium, and have a volume-average size that is no greater than 50 nanometers, and wherein the zirconia-based particles are discrete and have an organic material sorbed on a surface in an amount up to 15 weight percent based on the weight of the zirconia-based particles.

2. The zirconia-based particles of claim 1, wherein the zirconia-based particles have an average primary particle size that is no greater than 50 nanometers.

3. The zirconia-based particles of claim 1, wherein the zirconia-based particles have an average primary particle size that is no greater than 30 nanometers.

4. The zirconia-based particles of claim 1, wherein the zirconia-based particles comprise 0.1 to 10 mole percent lanthanide element oxide.

5. The zirconia-based particles of claim 1, wherein the zirconia-based particles comprise 0.1 to 10 mole percent lanthanide element oxide and 1 to 15 mole percent yttrium oxide.

6. The zirconia-based particles of claim 1, wherein the zirconia-based particles comprise 0.5 to 5 mole percent lanthanide element oxide and 5 to 15 mole percent yttrium oxide.

7. The zirconia-based particles of claim 1, wherein the zirconia-based particles comprise 1 to 7 mole percent lanthanide element oxide and 1 to 7 mole percent yttrium oxide.

8. The zirconia-based particles of claim 1, wherein the zirconia-based particles have a Z-average particle size determined by Photon Correlation Spectroscopy that is no greater than 70 nanometers.

9. The zirconia-based particles of claim 1, wherein the zirconia-based particles have a crystal structure that is at least 70 percent cubic, tetragonal, or a combination thereof.

10. A sol comprising at least 3 weight percent of zirconia-based particles dispersed, suspended, or a combination thereof in an aqueous medium, the zirconia-based particles comprising: a) 0.02 to 20 mole percent lanthanide element oxide based on total moles of inorganic oxide in the zirconia-based particles; b) 0.1 to 15 mole percent yttrium oxide based on total moles of inorganic oxide in the zirconia-based particles; and c) at least 80 mole percent zirconium oxide based on total moles of inorganic oxide in the zirconia-based particles; and wherein the zirconia-based particles are crystalline, doped with lanthanide element and yttrium, and have a volume-average size that is no greater than 50 nanometers, wherein the zirconia-based particles are discrete and have an organic material sorbed on a surface in an amount up to 15 weight percent based on the weight of the zirconia-based particles, and wherein less than 5 weight percent of the zirconia-based particles in the sol settle when the sol is stored for one week at room temperature.

11. The sol of claim 10, wherein the zirconia-based particle have an average primary particle size that is no greater than 50 nanometers.

12. The sol of claim 10, wherein the zirconia-based particle have an average primary particle size that is no greater than 30 nanometers.

13. The sol of claim 10, wherein the zirconia-based particles have a crystal structure that is at least 70 percent cubic, tetragonal, or a combination thereof.

14. A method of making a zirconia-based particles, the method comprising: preparing a feedstock comprising multiple salts dissolved, suspended, or a combination thereof in an aqueous-based medium, the multiple salts comprising a zirconium salt, a lanthanide element salt, and a yttrium salt, wherein the feedstock is acidic and wherein a majority of the multiple salts are carboxylate salts; subjecting the feedstock to a hydrothermal treatment to form a sol comprising at least 3 weight percent zirconia-based particles, wherein the zirconia-based particles comprise a) 0.02 to 20 mole percent lanthanide element oxide based on total moles of inorganic oxide in the zirconia-based particles; b) 0.1 to 15 mole percent yttrium oxide based on total moles of inorganic oxide in the zirconia-based particles; and c) at least 80 mole percent zirconium oxide based on total moles of inorganic oxide in the zirconia-based particles; and wherein the zirconia-based particles are crystalline, doped with lanthanide element and yttrium, and have a volume-average size that is no greater than 50 nanometers, wherein the zirconia-based particles are discrete and have an organic material sorbed on a surface in an amount up to 15 weight percent based on the weight of the zirconia-based particles, and wherein less than 5 weight percent of the zirconia-based particles in the sol settle when the sol is stored for one week at room temperature.

15. The method of claim 14, which further comprises subjecting the sol to dialysis, distillation, diafiltration, or a combination thereof to at least partially remove a by-product of the hydrothermal treatment, wherein the by-product comprises a dissolved carboxylic acid, carboxylate anion, or mixture thereof.

16. A composite material comprising a zirconia-based particles dispersed, suspended, or a combination thereof in an organic matrix, the zirconia-based particles comprising: a) 0.02 to 20 mole percent lanthanide element oxide based on total moles of inorganic oxide in the zirconia-based particles; b) 0.1 to 15 mole percent yttrium oxide based on total moles of inorganic oxide in the zirconia-based particles; and c) at least 80 mole percent zirconium oxide based on total moles of inorganic oxide in the zirconia-based particles; and wherein the zirconia-based particles are crystalline, doped with lanthanide element and yttrium, and have a volume-average size that is no greater than 50 nanometers, and wherein the zirconia-based particles are discrete and have an organic material sorbed on a surface an amount up to 15 weight percent based on the weight of the zirconia-based particles.

17. A sintered body comprising a product formed by sintering a zirconia-based particles, the zirconia-based particles comprising a) 0.02 to 20 mole percent lanthanide element oxide based on total moles of inorganic oxide in the zirconia-based particles; b) 0.1 to 15 mole percent yttrium oxide based on total moles of inorganic oxide in the zirconia-based particles; and c) at least 80 mole percent zirconium oxide based on total moles of inorganic oxide in the zirconia-based particles; and wherein the zirconia-based particles are crystalline, doped with lanthanide element and yttrium, and have a volume-average size that is no greater than 50 nanometers, and wherein the zirconia-based particles have an organic material sorbed on a surface in an amount up to 15 weight percent based on the weight of the zirconia-based particles.

* * * * *

UNITED STATES PATENT AND TRADEMARK OFFICE
CERTIFICATE OF CORRECTION

PATENT NO. : 9,950,932 B2
APPLICATION NO. : 13/512107
DATED : April 24, 2018
INVENTOR(S) : Brant Kolb It is certified that error appears in the above-identified patent and that said Letters Patent is hereby corrected as shown below:

Column 3
Line 12, delete "stoichiometeric" and insert -- stoichiometric --, therefor.

Column 10
Line 18, delete "autogeneous" and insert -- autogenous --, therefor.

Column 18
Line 43, after "sintering" insert -- . --.

Columns 21-22
Line 39 (approx.), delete "PROSTABB" and insert -- PROSTAB --, therefor.
Line 54, delete "Lanthunum" and insert -- Lanthanum --, therefor.
Line 54, delete "Lathanum" and insert -- Lanthanum --, therefor.

Column 24
Line 33 (approx.), after "6" insert -- . --.
Line 35 (approx.), delete "monoclininc" and insert -- monoclinic --, therefor.
Line 37 (approx.), after "100" insert -- . --.
Line 56 (approx.), after "weight$_{wet}$" insert -- . --.

Column 26
Line 54, delete "Corflex" and insert -- Coreflex --, therefor.

Column 35
Line 30, after "colored" insert -- . --.

Signed and Sealed this
Twenty-fifth Day of September, 2018

Andrei Iancu
*Director of the United States Patent and Trademark Office*

Column 43
Lines 63-64, delete "PROSTABB" and insert -- PROSTAB --, therefor.

Column 46
Line 34, in Claim 16, after "surface" insert -- in --.